United States Patent
Liran

(10) Patent No.: US 11,965,832 B2
(45) Date of Patent: Apr. 23, 2024

(54) REMOTE SENSING OF PLANT PHOTOSYNTHETIC CAPACITY

(71) Applicant: MIGAL GALILEE RESEARCH INSTITUTE LTD., Kiryat Shmona (IL)

(72) Inventor: Oded Liran, Kiryat Shemona (IL)

(73) Assignee: MIGAL GALILEE RESEARCH INSTITUTE LTD., Kiryat Shmona (IL)

(*) Notice: Subject to any disclaimer, the term of this patent is extended or adjusted under 35 U.S.C. 154(b) by 377 days.

(21) Appl. No.: 17/602,041

(22) PCT Filed: Apr. 7, 2020

(86) PCT No.: PCT/IL2020/050426
§ 371 (c)(1),
(2) Date: Oct. 7, 2021

(87) PCT Pub. No.: WO2020/208633
PCT Pub. Date: Oct. 15, 2020

(65) Prior Publication Data
US 2022/0196556 A1 Jun. 23, 2022

Related U.S. Application Data

(60) Provisional application No. 62/830,733, filed on Apr. 8, 2019.

(51) Int. Cl.
*G01N 21/64* (2006.01)
*A01C 21/00* (2006.01)
*G01N 21/84* (2006.01)

(52) U.S. Cl.
CPC ....... *G01N 21/6486* (2013.01); *A01C 21/007* (2013.01); *G01N 2021/8466* (2013.01)

(58) Field of Classification Search
CPC ....... G01N 21/6486; G01N 2021/8466; G01N 2021/1797; A01C 21/007; A01C 21/00
(Continued)

(56) References Cited

U.S. PATENT DOCUMENTS 4,804,849 A * 2/1989 Booth ................ G01N 21/6486
356/417
5,014,225 A * 5/1991 Vidaver ............... G01N 21/645
702/19
(Continued)

FOREIGN PATENT DOCUMENTS

CN 102483808 A * 5/2012 ......... G06K 9/00657
CN 106546568 A * 3/2017 ......... G01N 21/6456
(Continued)

OTHER PUBLICATIONS

Alonso et al., Improved Fraunhofer Line Discrimination Method for Vegetation Fluorescence Quantification, in IEEE Geoscience and Remote Sensing Letters, vol. 5, No. 4, pp. 620-624, Oct. 2008, doi: 10.1109/LGRS.2008.2001180.
(Continued)

*Primary Examiner* — Mahendra R Patel
(74) *Attorney, Agent, or Firm* — The Roy Gross Law Firm, LLC; Roy Gross

(57) ABSTRACT

A system comprising: at least one hardware processor; and a non-transitory computer-readable storage medium having stored thereon program instructions, the program instructions executable by the at least one hardware processor to: receive, as input, spectral image data representing spectral reflectance associated with at least one plant, calculate a first and second chlorophyll fluorescence indices in respective first and second wavelength bands, based, at least in part, on said spectral reflectance, and derive a quantum yield value with respect to said at least one plant, by: (i) dividing said first chlorophyll fluorescence index in a sum of said first and
(Continued)

second chlorophyll fluorescence indices, and (ii) multiplying (i) by a vegetation index value associated with said at least one plant.

20 Claims, 20 Drawing Sheets

(58) Field of Classification Search
USPC .......................................................... 382/110
See application file for complete search history.

(56) References Cited

U.S. PATENT DOCUMENTS

| | | | | |
|---|---|---|---|---|
| 5,426,306 | A * | 6/1995 | Kolber | G01N 21/64 250/461.1 |
| 5,854,063 | A * | 12/1998 | Li | G01J 3/2823 356/73 |
| 6,114,683 | A * | 9/2000 | Spiering | G01N 21/314 250/559.4 |
| 6,563,122 | B1 * | 5/2003 | Ludeker | G01N 21/6486 250/459.1 |
| 7,547,508 | B1 * | 6/2009 | Lefcourt | G01N 21/94 435/29 |
| 10,885,675 | B1 * | 1/2021 | Shulman | G06T 7/0004 |
| 11,263,707 | B2 * | 3/2022 | Perry | G06N 3/08 |
| 2004/0125371 | A1 * | 7/2004 | Chang | G01J 3/4406 250/461.1 |
| 2019/0293559 | A1 * | 9/2019 | Ogawa | G01N 21/55 |
| 2019/0369609 | A1 * | 12/2019 | Takashima | A01G 7/045 |

FOREIGN PATENT DOCUMENTS

| | | | | |
|---|---|---|---|---|
| CN | 106872424 | A * | 6/2017 | |
| EP | 3084401 | B1 * | 2/2022 | ............... A01G 7/00 |
| WO | WO-0025114 | A1 * | 5/2000 | ......... G01N 21/6456 |
| WO | WO-0113094 | A1 * | 2/2001 | ........... G01N 21/255 |
| WO | WO-2010085736 | A1 * | 7/2010 | ........... G01N 21/532 |
| WO | WO-2011069067 | A1 * | 6/2011 | ................ G01J 3/02 |
| WO | WO-2013181433 | A2 * | 12/2013 | ......... G01N 21/6408 |

OTHER PUBLICATIONS

Goulas Y, Fournier A, Daumard F, Champagne S, Ounis A, Marloie O, Moya I. Gross Primary Production of a Wheat Canopy Relates Stronger to Far Red Than to Red Solar-Induced Chlorophyll Fluorescence. Remote Sensing. 2017; 9 (1):97. https://doi.org/10.3390/rs9010097.

Haboudane, D., Miller, J. R., Pattey, E., Zarco-Tejada, P. J., & Strachan, I. B. (2004). Hyperspectral vegetation indices and novel algorithms for predicting green LAI of crop canopies: Modeling and validation in the context of precision agriculture. Remote sensing of environment, 90(3), 337-352.

Louis, J., et al. (2005). Remote sensing of sunlight-induced chlorophyll fluorescence and reflectance of Scots pine in the boreal forest during spring recovery. Remote Sensing of Environment, 96(1), 37-48. doi:10.1016/j.rse.2005.01.013.

Ounis, A., Bach, J., Mahjoub, A., Daumard, F., Moya, I., & Goulas, Y. (2016). Combined use of LIDAR and hyperspectral measurements for remote sensing of fluorescence and vertical profile of canopies. 2016. 87-94. 10.4995/raet.2016.3982.

Rascher, U., et al. CEFLES2: the remote sensing component to quantify photosynthetic efficiency from the leaf to the region by measuring sun-induced fluorescence in the oxygen absorption bands, Biogeosciences, 6, 1181-1198, https://doi.org/10.5194/bg-6-1181-2009, 2009.

Yang, P. (2018). Interpretation of Sun-Induced Chlorophyll Fluorescence for Remote Sensing of Photosynthesis [PhD Dissertation, University of Twente]. https://doi.org/10.3990/1.9789036545914.

F. Daumard et al., Continuous Monitoring of Canopy Level Sun-Induced Chlorophyll Fluorescence During the Growth of a Sorghum Field, in IEEE Transactions on Geoscience and Remote Sensing, vol. 50, No. 11, pp. 4292-4300, Nov. 2012, doi: 10.1109/TGRS.2012.2193131.

Grossmann, K., Frankenberg, C., Magney, T.S., Hurlock, S.C., Seibt, U., & Stutz, J. (2018). PhotoSpec: A new Instrument to measure spatially distributed red and far-red Solar-Induced Chlorophyll Fluorescence. Remote Sensing of Environment. DOI:10.1016/j.rse.2018.07.002.

Meroni, Michele & Colombo, Roberto. (2006). Leaf level detection of solar induced chlorophyll fluoresence by means of a subnanometer resolution spectroradiometer. Remote Sensing of Environment. 103. 438-448. 10.1016/j.rse.2006.03.016.

J. F. Moreno et al., Very high spectral resolution imaging spectroscopy: The Fluorescence Explorer (FLEX) mission, 2016 IEEE International Geoscience and Remote Sensing Symposium (IGARSS), Beijing, China, 2016, pp. 264-267, doi: 10.1109/IGARSS.2016.7729060.

Ulrich Schreiber, Chapter 11: Pulse Amplitude Modulation (PAM) Fluorometry and Saturation Pulse Method, An Overview, in Chlorophyll a Fluorescence: A Signature of Photosynthesis, 2004, Springer, George C. Papageorgiou and Govindjee (eds), pp. 279-319.

Schreiber, U., Schliwa, U. & Bilger, W. Continuous recording of photochemical and non-photochemical chlorophyll fluorescence quenching with a new type of modulation fluorometer. Photosynth Res 10, 51-62 (1986). https://doi.org/10.1007/BF00024185.

Nicodemus, F. E. ; Richmond, J. C. ; Hsia, J. J. ; Ginsberg, I. W. ; Limperis, T. Geometrical considerations and nomenclature for reflectance, Oct. 1977.

Jassby, A.D., & Platt, T. (1976). Mathematical formulation of the relationship between photosynthesis and light for phytoplankton. Limnology and Oceanography, 21, 540-547. https://doi.org/10.4319/lo.1976.21.4.0540.

Henley, W. J. (1993). Measurement and interpretation of photosynthetic light-response curves in algae in the context of photoinhibition and diel changes. Journal of Phycology, 29(6), 729-739. doi:10.1111/j.0022-3646.1993.00729.x.

Burkart, Andreas & Cogliati, Sergio & Schickling, A.. (2014). A Novel UAV-Based Ultra-Light Weight Spectrometer for Field Spectroscopy. Sensors Journal, IEEE. 14. 62-67. 10.1109/JSEN.2013.2279720.

Hammen, David, "Earth-Sun distance on a given day of the year, " Physics Stack Exchange, (https://physics.stackexchange.com/users/52112/david-hammen, 2015.

Plascyk, J. A. (1975). The MK II Fraunhofer Line Discriminator (FLD-II) for Airborne and Orbital Remote Sensing of Solar-Stimulated Luminescence. Optical Engineering, 14(4). doi: 10.1117/12.7971842.

Eilers, P. H. C., & Peeters, J. C. H. (1988). A model for the relationship between light intensity and the rate of photosynthesis in phytoplankton. Ecological Modelling, 42(3-4), 199-215. doi:10.1016/0304-3800(88)90057-9.

Genty, B., Briantais, J.-M., & Baker, N. R. (1989). The relationship between the quantum yield of photosynthetic electron transport and quenching of chlorophyll fluorescence. Biochimica et Biophysica Acta (BBA)—General Subjects, 990(1), 87-92. doi: 10.1016/s0304-4165(89)80016-9.

Gamon, J. A., Peñuelas, J., & Field, C. B. (1992). A narrow-waveband spectral index that tracks diurnal changes in photosynthetic efficiency. Remote Sensing of Environment, 41(1), 35-44. doi: 10.1016/0034-4257(92)90059-s.

Maxwell K, Johnson GN. Chlorophyll fluorescence—a practical guide. J Exp Bot. Apr. 2000; 51(345):659-68. doi: 10.1093/jxb/51.345.659. PMID: 10938857.

Van de Hulst, H. C. (1980). Multiple light scattering. New York: Academic, 1.

PCT International Search Report for International Application No. PCT/IL2020/050426, dated Aug. 3, 2020, 4pp.

PCT Written Opinion for International Application No. PCT/IL2020/050426, dated Aug. 3, 2020, 10pp.

(56) References Cited

OTHER PUBLICATIONS

PCT International Preliminary Report on Patentability for International Application No. PCT/IL2020/050426, dated Sep. 21, 2021, 11pp.

* cited by examiner

REMOTE SENSING OF PLANT PHOTOSYNTHETIC CAPACITY

CROSS-REFERENCE TO RELATED APPLICATIONS

This application is a National Phase of PCT Patent Application No. PCT/IL2020/050426 having International filing date of Apr. 7, 2020, which claims the benefit of U.S. Provisional Patent Application No. 62/830,733, filed Apr. 8, 2019, the contents of which are all incorporated herein by reference in their entirety.

FIELD OF THE INVENTION

The present invention relates to the field of remote spectrometry.

BACKGROUND

Plants absorb sunlight energy and use it to perform photosynthesis to produce carbohydrates, which supply the plant with chemical energy to fuel plant activities. However, not all absorbed sunlight energy is used for the photochemical process—portions of it can be dissipated as heat, or emitted as fluorescence.

The efficiency with which light is converted into carbohydrate in the photosynthesis process can be expressed in terms of quantum yield. The quantum yield of photosynthesis, in turn, can be derived from measurements of light intensity and rate of photosynthesis in the plant.

Fluorometry of plant fluorescence emittance can provide an indication of plant photosynthetic activity and efficiency. However, current fluorometry methods typically require measuring fluorescence at the plant leaf level, and therefore are costly and labor intensive.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a system comprising: at least one hardware processor; and a non-transitory computer-readable storage medium having stored thereon program instructions, the program instructions executable by the at least one hardware processor to: receive, as input, spectral image data representing spectral reflectance from at least one plant, calculate a first and second chlorophyll fluorescence indices in respective first and second wavelength bands, based, at least in part, on the spectral reflectance, and derive a quantum yield value with respect to the at least one plant, by: (i) dividing the first chlorophyll fluorescence index in a sum of the first and second chlorophyll fluorescence indices, and (ii) multiplying (i) by a vegetation index value associated with the at least one plant.

There is also provided, in an embodiment, a method comprising: receiving, as input, spectral image data representing spectral reflectance from at least one plant; calculating a first and second chlorophyll fluorescence indices in respective first and second wavelength bands, based, at least in part, on the spectral reflectance; and deriving a quantum yield value with respect to the at least one plant, by: (i) dividing the first chlorophyll fluorescence index in a sum of the first and second chlorophyll fluorescence indices, and (ii) multiplying (i) by a vegetation index value associated with the at least one plant.

There is further provided, in an embodiment, a computer program product comprising a non-transitory computer-readable storage medium having program instructions embodied therewith, the program instructions executable by at least one hardware processor to: receive, as input, spectral image data representing spectral reflectance from at least one plant, calculate a first and second chlorophyll fluorescence indices in respective first and second wavelength bands, based, at least in part, on the spectral reflectance, and derive a quantum yield value with respect to the at least one plant, by: (i) dividing the first chlorophyll fluorescence index in a sum of the first and second chlorophyll fluorescence indices, and (ii) multiplying (i) by a vegetation index value associated with the at least one plant.

In some embodiments, the spectral image data comprises spectral image data received from a first spectral sensor configured to measure reflected light from a canopy of the at least one plant.

In some embodiments, the first spectral sensor is configured to perform the measuring remotely.

In some embodiments, the spectral image data further comprises spectral image data received from a second spectral sensor configured to measure ambient spectral irradiance received by the at least one plant.

In some embodiments, the first and second chlorophyll fluorescence indices are calculated based, at least in part, on (i) the spectral reflectance, and (ii) the ambient spectral irradiance received by the at least one plant.

In some embodiments, the first and second chlorophyll fluorescence indices are each sun-induced fluorescence (SIF) indices.

In some embodiments, the first wavelength band is a Fraunhofer $O_2$-A spectral absorption line, and the second wavelength band is a Fraunhofer $O_2$-B oxygen spectral absorption line.

In some embodiments, the vegetation index is a normalized difference vegetation index (NDVI).

In some embodiments, the method further comprises calculating, and the program instructions are further executable to calculate, an electron transport rate value with respect to the at least one plant, by multiplying the calculated quantum yield value by a sunlight intensity parameter measured concurrently with the spectral image data.

In some embodiments, the method further comprises calculating, and the program instructions are further executable to calculate, a light response curve with respect to the at least one plant, based, at least in part, on a specified number of the electron transport rate values calculated at different times of a day. In some embodiments, the specified number is at least 4.

In some embodiments, the method further comprises determining, and the program instructions are further executable to determine, with respect to the at least one plant, at least one of: light use efficiency, chronic photo inhibition, maximum photosynthetic activity, antenna size, an irrigation parameter, and a fertilization parameter.

In addition to the exemplary aspects and embodiments described above, further aspects and embodiments will become apparent by reference to the figures and by study of the following detailed description.

BRIEF DESCRIPTION OF DRAWINGS

For a better understanding of various embodiments of the invention and to show how the same may be carried into effect, reference will now be made, by way of example, to the accompanying drawings. Structural details of the invention are shown to provide a fundamental understanding of the invention, the description, taken with the drawings, making apparent to those skilled in the art how the several forms of the invention may be embodied in practice.

DETAILED DESCRIPTION

Figure 1:
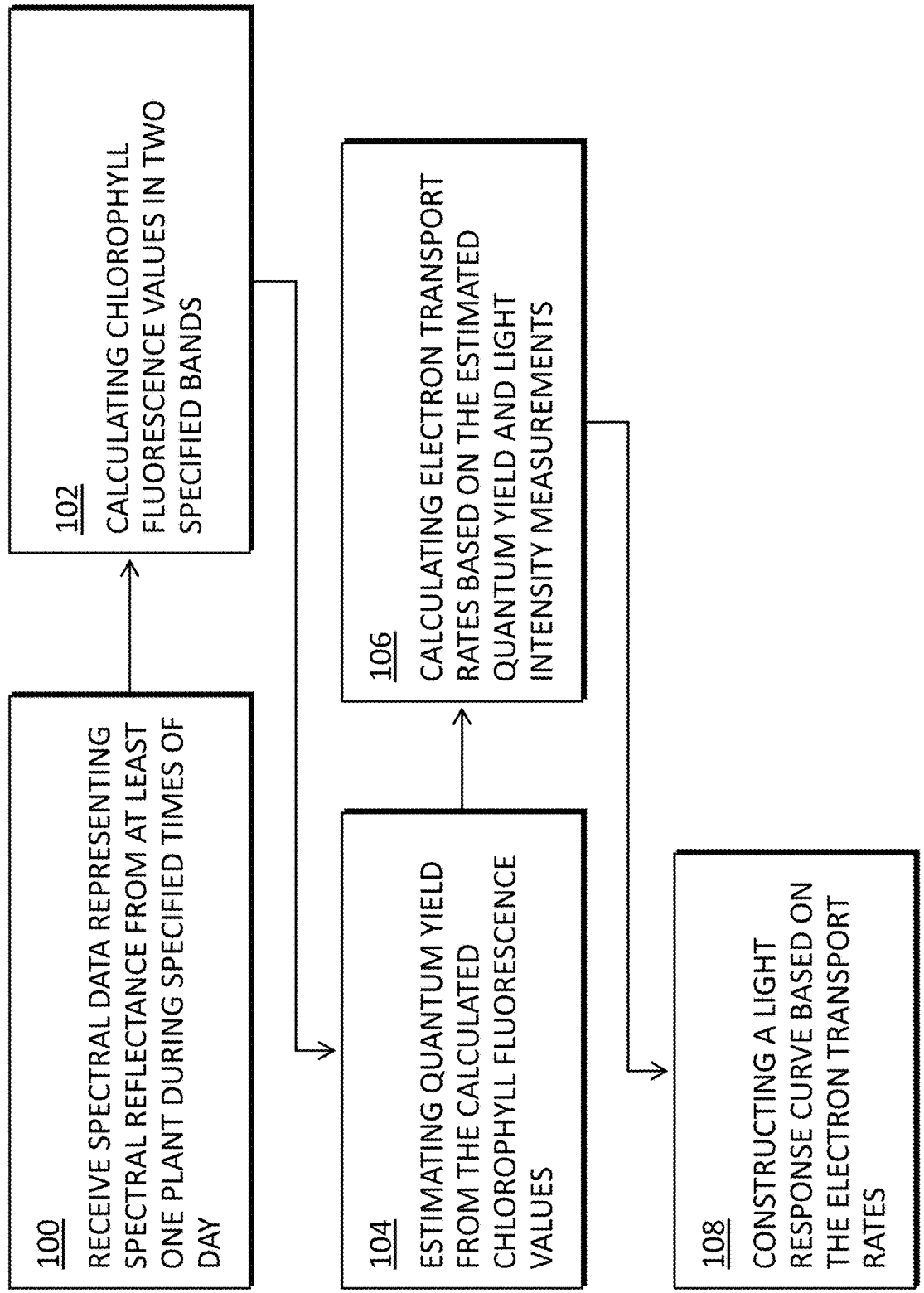
FIG. 1 is a flowchart of the functional steps in a process for automated remote estimation of canopy-level quantum yield value in one or more plants, in accordance with some embodiments of the present disclosure.

Disclosed are a system, method, and computer program product for automated remote estimation of canopy-level quantum yield value in one or more plants.

In some embodiments, quantum yield value estimation according to the present disclosure is based, at least in part, on remote measuring of chlorophyll fluorescence values, e.g., sun-induced fluorescence (SIF) signals, with respect to a plant under observation.

In some embodiments, the present remotely-obtained quantum yield evaluation facilitates the construction of a plant-specific light response curve of the plant, i.e., the quantum yield of the plant in response to changing absorbed light intensities.

In some embodiments, the remote measuring of chlorophyll fluorescence values may be carried out by acquiring spectral image data representing spectral reflectance from a plant under observation. In some embodiments, remote acquisition of spectral image data may be performed using any remotely-located optical spectrometers and/or a multi-spectral and/or a hyper-spectral imaging devices. In some embodiments, the imaging devices may be placed, e.g., overhead relative to the plant, to measure spectral reflectance from, e.g., a canopy of the plant, or may be used in conjunction with any airborne platform (e.g., an unmanned aerial vehicle, drone, an airplane, a satellite, and the like).

In some embodiments, chlorophyll fluorescence values, e.g., SIF signals, may be calculated in two spectral bands representing spectral absorption lines, e.g., Fraunhofer $O_2$-A and $O_2$-B spectral absorption bands.

In some embodiments, quantum yield estimations may be calculated based, at least in part, on the chlorophyll fluorescence values and a vegetation index associated with the plant under observation. In some embodiments, the vegetation index may be a normalized difference vegetation index (NDVI).

In some embodiments, the present disclosure provides for further calculating an electron transport rate value with respect to the plant under observation, by multiplying the estimated quantum yield value by a sunlight intensity parameter measured concurrently with the chlorophyll fluorescence values.

In some embodiments, a specified number of electron transport rate values calculated at different times of a day may provide for deriving a light response curve with respect to the plant under observation.

Accordingly, in some embodiments, the present disclosure provides for a novel remote sensing calculation of quantum yield and non-cyclic electron transport rate of crops out of the photosynthetic apparatus. The advent of modern drone technology introduces the ability to obtain airborne remote measurements multiple times per day. It thus enables the exploration of the required temporal resolution of diurnal changes in photosynthesis and, at the same time, evaluation of crop primary production, while relying on the history of the crop grown until the point of measurement.

In some embodiments, the present disclosure thus provides for establishing an accurate correlation between remote and leaf-level photosynthetic measurement techniques, to ensure adequate accuracy of the present remote sensing method. Photosynthetic efficiency may be measured by a fluorometer, employing pulse amplitude modulation (PAM), but to be an accurate indicator for a field of plants, this method requires multiple tests of leaves that are checked individually by the fluorometer. By contrast, embodiments of the present invention employ remote measurements techniques.

A potential advantage of the present disclosure is, therefore, in that it provides for constructing a complete and accurate light response curve with respect to a single plant or two or more plants, e.g., a field of plants, using solely remote sensing methods. Accordingly, the present disclosure enables evaluating the well-being and treatment adequacy of plants remotely, using available and cost-effective methods, which save time and labor costs compared with existing methods which typically require laborious leaf-level measurements to achieve a similar level of accuracy.

In some embodiments, an aim of the present disclosure is to provide a system and methods for determining crop management practices for timely and appropriate irrigation and fertilizer application, thereby improving crop nutrient uptake for reaching maximum crop yield with minimum waste of fertilizer and water.

In some embodiments, reflectance of canopies of crops is measured to determine a "normalized SIF response index,"

(NSRI), which is indicative of photosynthetic quantum yield and of relative electron transport rate (ETR), both of which are indicators of photosynthetic efficiency of a given crop. By comparing photosynthetic efficiency of crops of the same type that have received different treatments, a convenient indicator of treatment adequacy is provided.

By way of background, primary plant production is the process of plants producing carbohydrates from absorbed sunlight energy. During light harvesting, the absorbed energy may either be used in the photochemistry process, where light energy is transferred into chemical energy, or it can be dissipated as heat or emitted back to the atmosphere as fluorescence.

The emitted fluorescence, which is naturally emitted by plants during photosynthesis, is thus linked to primary production, and its detection may provide an indication of the plant's well-being. The detection of fluorescence emitted by the photosynthetic apparatus is possible using a number of method and techniques at varying distances, starting at leaf-level measurements on a single plant through canopy-level whole-plant measurements, to entire field measurements.

At the leaf level, the pulse amplitude modulation (PAM) technique enables recording the emitted fluorescence, to obtain a signal from which the quantum yield of photosystem II (PSII) can be derived. The quantum yield value indicates successful excitation of electrons on PSII, and therefore, when it is multiplied by the light intensity during the excitation, assesses the electron transport rate from photosystem II towards the production of Nicotine Amide DiPHosphate (NADPH). This product, together with Adenosine TriPhosphate (ATP) that is created by photophosphorylation on the same apparatus, will be used later as chemical constituents in the Calvin-Benson-Bassham (CBB) cycle in order to assimilate carbon into Glyceraldehyde-3-phosphate, the precursor for sugars.

Fluorescence can also be detected remotely, at the canopy level, via spectral absorption measurement using, e.g., the Fraunhofer line discrimination (FLD) technique. This method exploits the overlap between the natural atmospheric oxygen absorption lines with the fluorescence emission spectrum from the plants. Quantum yield may thus be derived by combining it with the magnitude of the absorbed light over the canopies.

Once obtained, quantum yield values measured during different times of the day can be associated with light intensities during the same times, to generate a light response curve for the plant. The light response curve follows a hyperbolic function which predicts the behavior of the photosynthetic rate in the plant with varying light intensities. The light response curve is generally divided into three parts:

The light limiting region, where the photosynthetic rate is affected only by light intensity;
the carbon fixation limiting region, where the photosynthetic rate reaches a plateau and is not increasing with an increase in light intensity; and
the photo inhibited region, where the photosynthetic rate starts to decline due to the closure of the photosynthetic units (a state typically achieved only in times of severe stress when the plant cannot cope with excess of absorbed energy).

Fitting a hyperbolic function to the light response curve, in turn, enables the extraction of additional valuable parameters related to the physiology of the plant, such as the prediction of the light intensity level at which photosynthetic activity reaches its maximum. Thus, a remotely-sensed light response curves can provide information on photosynthesis capability at a whole plant level, as well as a whole field level.

Although the retrieval of a sun induced fluorescence (SIF) signal remotely is possible using any available airborne platform (e.g., drones, satellites, airplanes), constructing a complete light response curve of a whole plant or a field of plants requires multiple measurements at different times of the day, using, e.g., multiple passes of the airborne acquisition platform.

FIG. 1 is a flowchart of the functional steps in a process for automated remote estimation of canopy-level quantum yield value in one or more plants, in accordance with some embodiments of the present disclosure.

At step 100, in some embodiments, spectral image data representing spectral reflectance from at least one plant may be received. The spectral image data may be received from, e.g., any spectral imaging device, e.g., a spectroradiometer configured to measure light reflected from a crop canopy. The spectral imaging device may be mounted on any platform, which may be ground-based or airborne, configured to measure spectral image data from above a canopy.

In some embodiments, the spectral image data may represent two or more separate measurements at different times of day, e.g., at least four different measurements between early morning and 12:00 noon, e.g., at 07:30 am, 09:00 am, 10:30 am, and 12:00 μm.

At step 102, in some embodiments, chlorophyll fluorescence indices, e.g., SIF signals, may be calculated in respective wavelength bands, e.g., Fraunhofer $O_2$-A and $O_2$-B spectral absorption bands. In some embodiments, the respective wavelengths may be approximated as 760 nm and 687 nm respectively. In some embodiments, SIF signals may be calculated with respect to multiple spectral image data measurements representing a different time of the day.

At step 104, in some embodiments, a quantum yield value may be estimated with respect to the plant, by dividing the $SIF_{687}$ signal (in the Fraunhofer B oxygen spectral absorption line), in a sum of the $SIF_{687}$ and $SIF_{760}$ signals (in the Fraunhofer B and Fraunhofer A oxygen spectral absorption lines), e.g.:

$$\frac{SIF_{687}}{SIF_{687} + SIF_{760}}$$

In some embodiments, the result may be multiplied by a vegetation index value associated with the plant, e.g., a normalized difference vegetation index (NDVI), to obtain the estimated quantum yield:

$$\frac{SIF_{687}}{SIF_{687} + SIF_{760}} \cdot NDVI$$

In some embodiments, NDVI may be calculated as:

$(\rho 800 - \rho 670)/(\rho 800 + \rho 670)$

See, e.g., Haboudane D, Miller J R, Pattey E, Zarco-Tejada P J, Strachan I B (2004) Hyperspectral vegetation indices and novel algorithms for predicting green LAI of crop canopies: Modeling and validation in the context of precision agriculture. *Remote Sensing of Environment* 90(3): 337-352

In some embodiments, estimated quantum yield may be calculated with respect to multiple spectral image data measurements representing a different time of the day.

In some embodiments, at step 106, electron transport rate may be calculated based, at least in part, on the estimated quantum yield and light intensity measurements with respect to the plant, taken concurrently with the spectral image data measurements which were used to calculate the SIF signals. In some embodiments, light intensity may be calculated with respect to the photosynthetically active radiation (PAR) spectral range of solar radiation, e.g., from approx. 400 to 700 nm, which is the spectral range that photosynthetic organisms are able to use in the process of photosynthesis. In some embodiments, PAR values may be received from an external source, e.g., a metrological station and the like.

In some embodiments, light intensity values may be measured so as to represent the amount of solar radiation received by the plant under analysis.

Accordingly, in some embodiments, at step 106, electron transport rate values may be derived as follows:

$$\frac{SIF_{687}}{SIF_{687} + SIF_{760}} \cdot NDVI \cdot PAR$$

In some embodiments, electron transport rate values may be calculated with respect to multiple spectral image data measurements representing a different time of the day.

In some embodiments, at step 108, a light response curve may be constructed from the separate electron transport rate values.

Experimental Results
Experimental Site and Crops

An initial winter-based dataset was constructed from acquisitions of a C3 crop *L. sativa* within a greenhouse located to at coordinates 33° 09'10.3"N, 35° 37'23.4"E in the Upper Galilee region in Israel. The greenhouse comprised a scattering UV-VIS polygon sheet and a shade net. The cultivation period took place during the winter of 2018, starting on Feb. 7, 2018 through Mar. 6, 2018. The internal greenhouse climate was monitored by a Galcon humidity and temperature controller, which has a direct control on opening or closing transparent curtains, thus keeping the humidity and temperature at about 70%-85% (early morning to noon), and 8° C. above the external temperature. A respective initial summer-based dataset was collected from a C4 crop *Z. mays* in open field conditions at coordinates 33° 10'48.7"N 35°34'58.5"E, in proximity to the winter experiment site. The cultivation period took place during the period Sep. 6, 2017 to Nov. 29, 2017.

Crop Fertilization Treatments

*L. sativa* was fertigated with a gradient of Shefer-1 (ICL, Israel) liquid fertilizer with 5:3:8 N:P:K+3 µgr micro elements, in the following concentrations: 30, 60, 120 and 300 ppm as identified by the total nitrogen amount in the fertilizer.

Four sections of plants were grown, each with 30 pots each. Each section received different fertigation treatments that included fertilization as part of the irrigation treatment, fertilization levels for the different sections being 30, 60, 120 and 300 ppm nitrogen respectively. The fertilizer macronutrient ratio was 5:3:8 N:P:K for all sections. Each section had its own irrigation supply line, controlled by a pump with an hourly flow. Fertigation was 10 minutes every 6 hours on average. Plant treatments were organized randomly in each line.

Sensors System Setup

The present experimentation comprised a spectral measuring system configured for measuring spectral radiance and reflectance over selected crop targets. The spectral sensor system comprises an overhead and/or aerial unit and a ground unit. The overhead unit is placed over the point of interest and measures an upwelling radiance, while the ground unit acquires the sun irradiance over a white reference (e.g., a reflective panel).

In addition, a 'leaf level' fluorometry device was employed to measure the 'ground truth' quantum yield from the leaves.

The remote overhead sensor may be set to heights between 0.5-10 meters above the crop canopies. The remote sensor may alternatively be installed on an airborne platform, e.g., a drone, to quickly measure large areas of crops. The ground sensor was set at 0.2 meters above the reflective panel.

Table 2 illustrates an accuracy at the $O_2A$ Fraunhofer atmospheric absorption line of oxygen. Each reflectance profile was constructed from the scattered light returning from both measurement modalities:

| Device | Total Range [nm] | Examined Range [nm] | Spectral shift [nm] | FWHM [nm]T |
|---|---|---|---|---|
| Upwelling radiance | 337.08-822.16 | 754-775 | −0.047 | 1.5 |
| Downwelling irradiance | 336.24-822.56 | 754-775 | 0.053 | 1.85 |

*T FWHM stands for Full Width of signal at Height Maximum, the point where the maximal spectral resolution is achieved.

Chlorophyll Fluorescence Measurements

Leaf-level reference fluorescence measurements were performed with a pulsed amplitude modulation (PAM) fluorometer (e.g., FP100-Max, Photon System Instruments, Czech Republic) on the 3-5 fully expanded young leaves within each potted crop. Remote fluorescence was calculated as suggested by Alonso (2008) at the $O_2$-A and $O_2$-B Fraunhofer atmospheric absorption bands. See, e.g., Alonso L, et al. (2008) Improved Fraunhofer Line Discrimination Method for Vegetation Fluorescence Quantification. *IEEE Geoscience and Remote Sensing Letters* 5(4): 620-624.

Light Response Curve Construction and Non-Linear Fitting Procedure

Quantum yield per light intensity at the day of the measurement was calculated using the following equation:

$$\frac{SIF_{687}}{SIF_{687} + SIF_{760}} \cdot NDVI$$

where the quantum yield is a combination of the normalized fraction of $SIF_{687}$ to the overall fluorescence emission in both of the lines multiplied by the Normalized Differential Vegetation Index (NDVI).

The electron transport rate was then calculated by multiplying the quantum yield term by a light intensity parameter (i.e., photosynthetically active radiation, PAR) received from a nearby meteorological station for both datasets acquired. A non-linear hyperbolic model was fitted to each of the biological repeats. See, e.g., Eilers P H C, Peeters J C H (1988) A model for the relationship between light intensity and the rate of photosynthesis in phytoplankton. *Ecological Modelling* 42(3): 199-215.

Statistical Analyses

Each group of fertilization treatments was checked for the presence of outliers; samples that exceeded 1.5 times the interquartile range in each group were omitted from further analysis. Then, groups of fertilization treatments were checked for normal distribution via a Shapiro-Wilk test and for homogeneity of variances via Levene's test. An ANalysis Of Variances (ANOVA) was applied when both tests were satisfied. In case one of the tests was violated, Welch's ANOVA was used instead, and if both tests were violated, a Kruskal-Wallis ANOVA was used. In order to compare between different times of the day or different days during cultivation season, repeated measures ANOVA were used if Mauchly's sphericity test was satisfied. In case the sphericity test was violated, Friedman's non-parametric repeated measures ANOVA was used instead.

In order to check for pairwise correlations between groups, each group was tested for homoscedasticity in addition to normal distribution, and then a Pearson's correlation test was applied to the entire set. If the homoscedasticity test was violated, a Spearman's rank non-parametric correlation test was used instead. Linear regressions, as well as curves fitting were performed with the 'data solver' module in Excel, and the least squares method. Statistical analyses were carried out in SPSS (IBM, Chicago, USA).

Calculations and Results

Figure 2A:
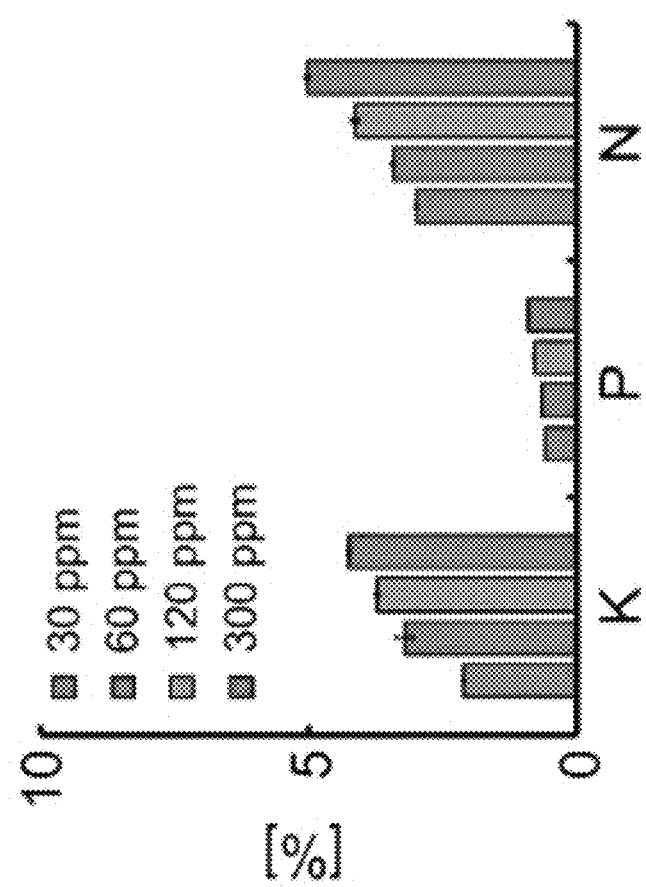
FIGS. 2A-2C illustrate experimental conditions during the fertilization gradient experiment on *L. sativa*, in accordance with some embodiments of the present disclosure.
Figure 2B:
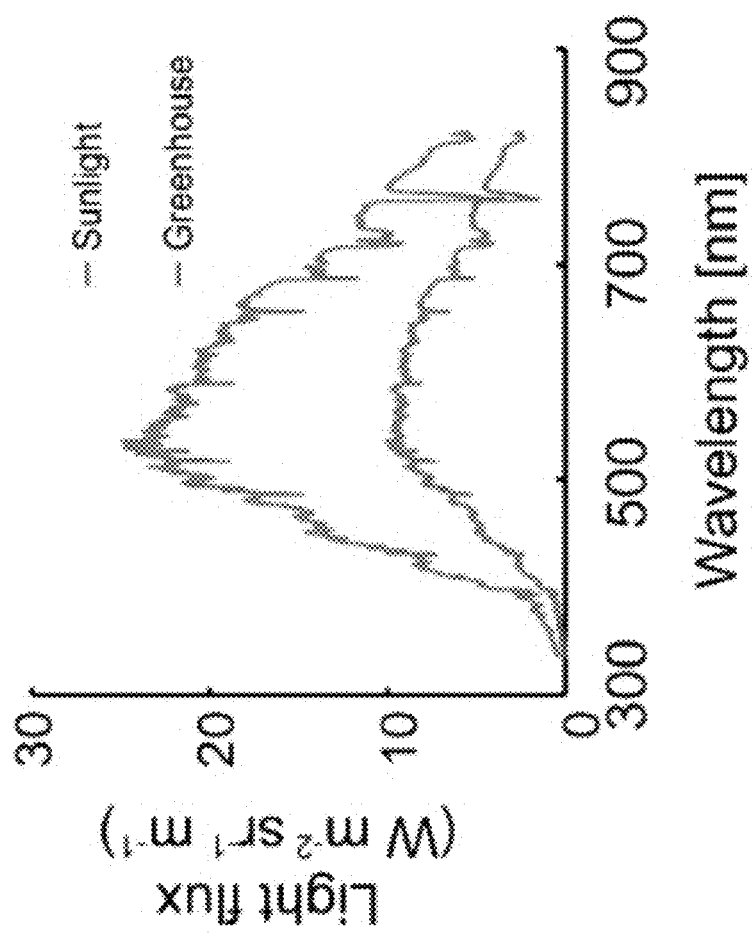
Figure 2C:
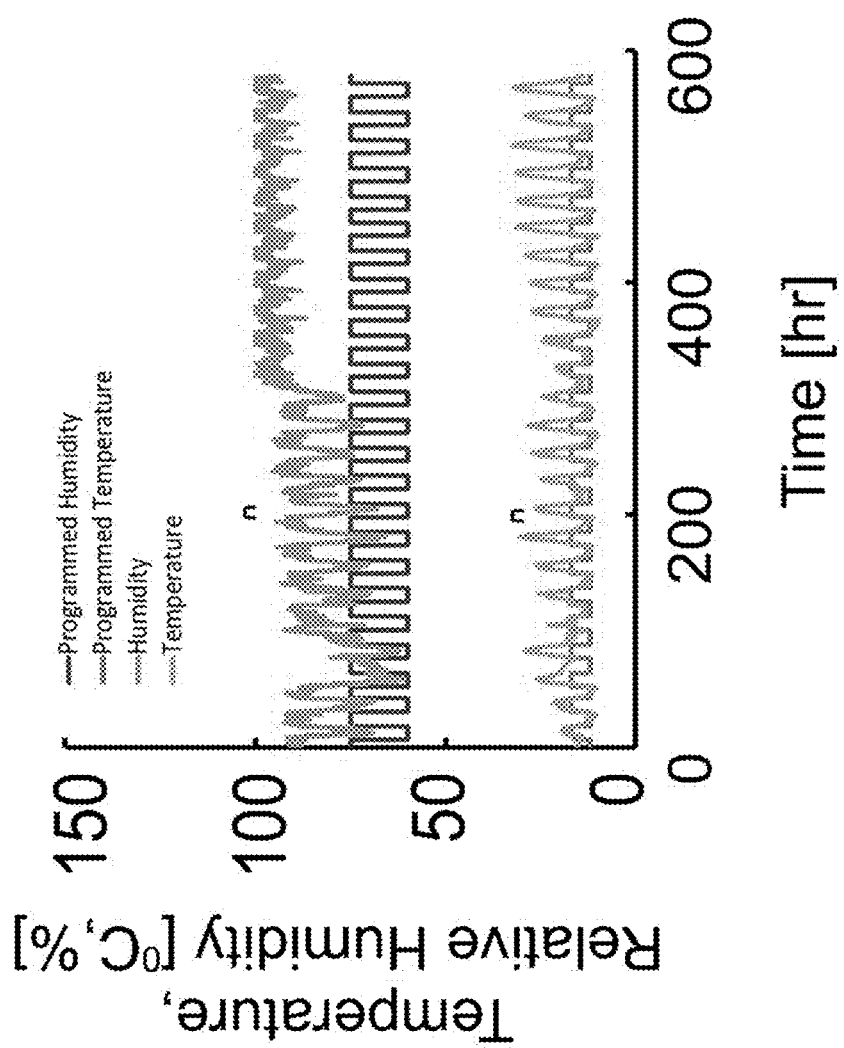

FIGS. 2A-2C illustrate experimental conditions during the fertilization gradient experiment on *L. sativa*.

FIG. 2A illustrates results of chemical analyses of macronutrients in leaves, in order to confirm the fertilization gradient administered. Differences between groups are statistically significant at $p < 0.05$ confidence level.

FIG. 2B show light intensity inside the greenhouse as compared to external light intensity, wherein the greenhouse is designed to facilitate a shading net responsible for decreasing the maximal light intensity by 30% at the maximal peak of the sun's Planck distribution at ~530 nm. In order to confirm the design, two spectra were acquired at noon before the experiment started (inside and outside the greenhouse)

FIG. 2C shows humidity and temperature controller setting and actual measurements during the cultivation of *L. sativa*.

Figures 3A, 3B:
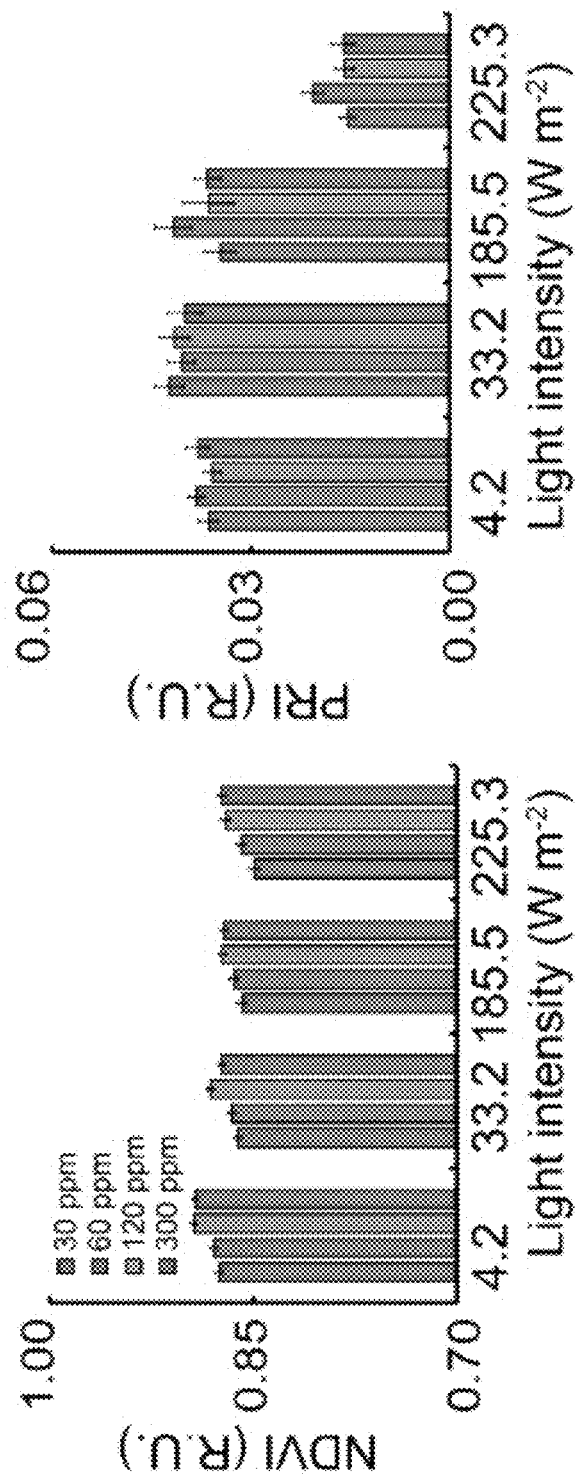
FIGS. 3A-3D show vegetation Indices and sun-induced fluorescence (SIF) calculated for *L. sativa*, along a fertilizer gradient, two weeks after planting, in accordance with some embodiments of the present disclosure.
Figures 3C, 3D:
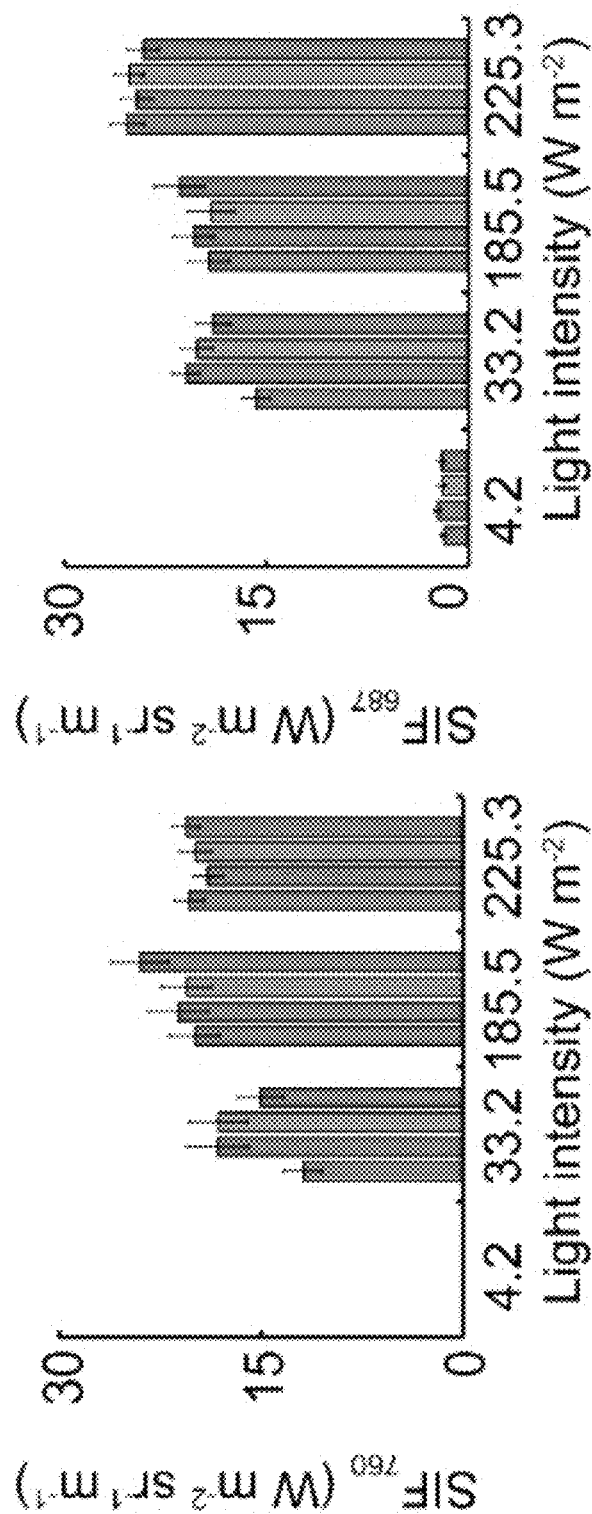

FIGS. 3A-3D show vegetation Indices and sun-induced fluorescence (SIF) calculated for *L. sativa*, along a fertilizer gradient, two weeks after planting. Measurements were taken four times during the day at 07:30 AM, 09:00 AM, 10:30 AM and 12:00 PM, with the corresponding light intensity recorded from a nearby meteorological station. This was divided by 2.5 to resemble the intensity within the greenhouse with 4.2, 33.2 185.5 and 225.3 (W m$^{-2}$), respectively. The graphs in FIGS. 3A-3D represent Normalized Differential Vegetation Index, HyperSpectral Index (HSI), Photosynthesis Response Index(36), and SIF$_{760}$ and SIF$_{687}$, respectively. The bars represent the fertilizer gradient (e.g., 30, 60, 120 and 300 ppm) of the total nitrogen, respectively. Error bars represent standard error of the mean at n=30 per fertilization treatment. The values of the SIF$_{760}$ at 07:30 AM came out negative during calculation and were therefore considered as zero in FIG. 3C, because fluorescence cannot be negative. In FIG. 3A, differences in treatments between and within hours are statistically significant at the $p < 0.05$ confidence level. In FIG. 3B, differences in treatments between hours are statistically significant at the $p < 0.05$ confidence level. In FIG. 3C, differences only between 30 and 300 ppm are statistically significant between time points at the $p < 0.05$ confidence level. In FIG. 3D, differences in treatments between hours are statistically significant at the $p < 0.05$ confidence level.

FIG. 4A-4D show remoteسensing quantum yield calculations compared with the ground truth Pulsed Amplitude Modulation (PAM) technique of photosynthetic performance of *L. sativa*, in four separate time instances during the day of the measurement.

Figure 4A:
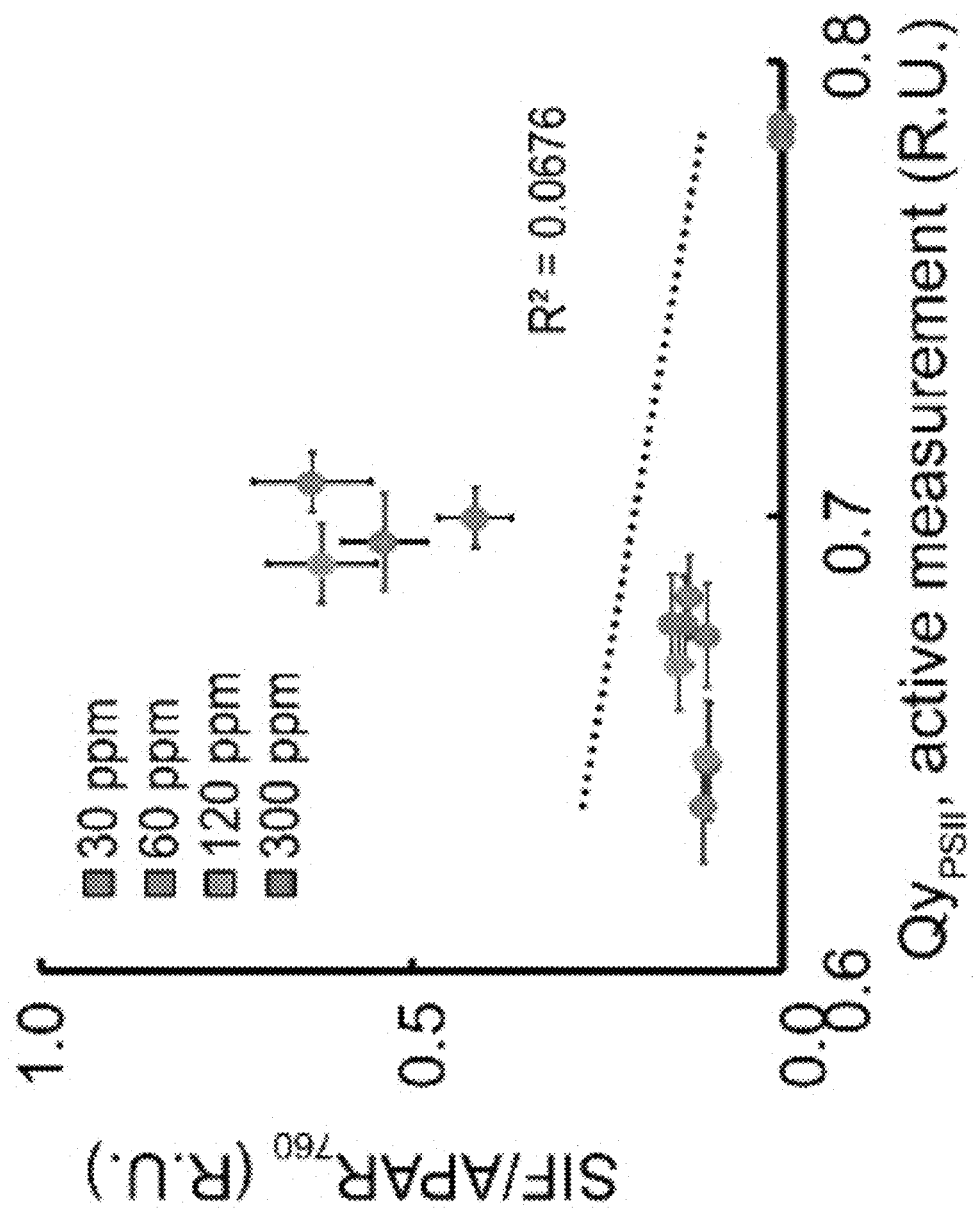
FIG. 4A-4D show remote sensing quantum yield calculations compared with the ground truth Pulsed Amplitude Modulation (PAM) technique of photosynthetic performance of *L. sativa*, in four separate time instances during the day of the measurement, in accordance with some embodiments of the present disclosure.
Figure 4B:
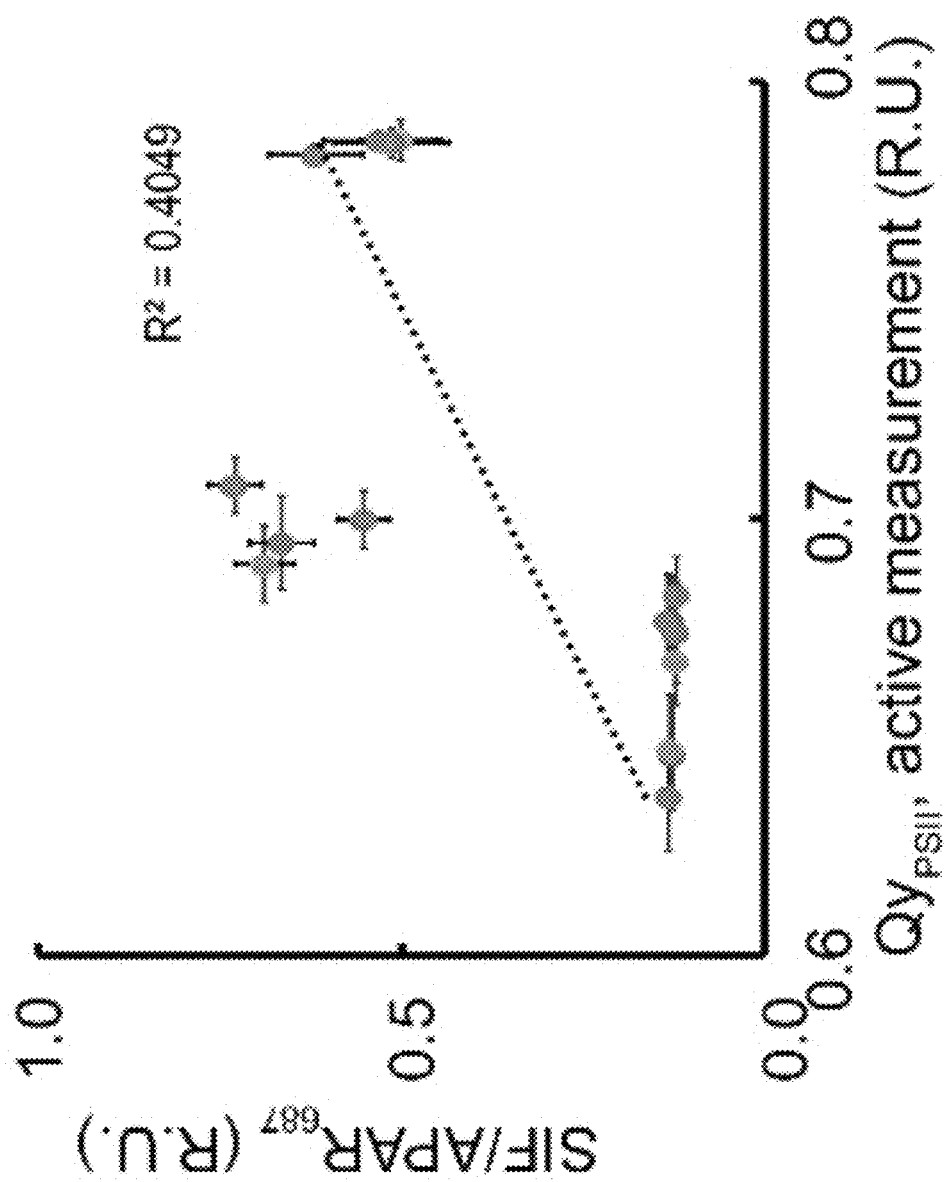
Figure 4C:
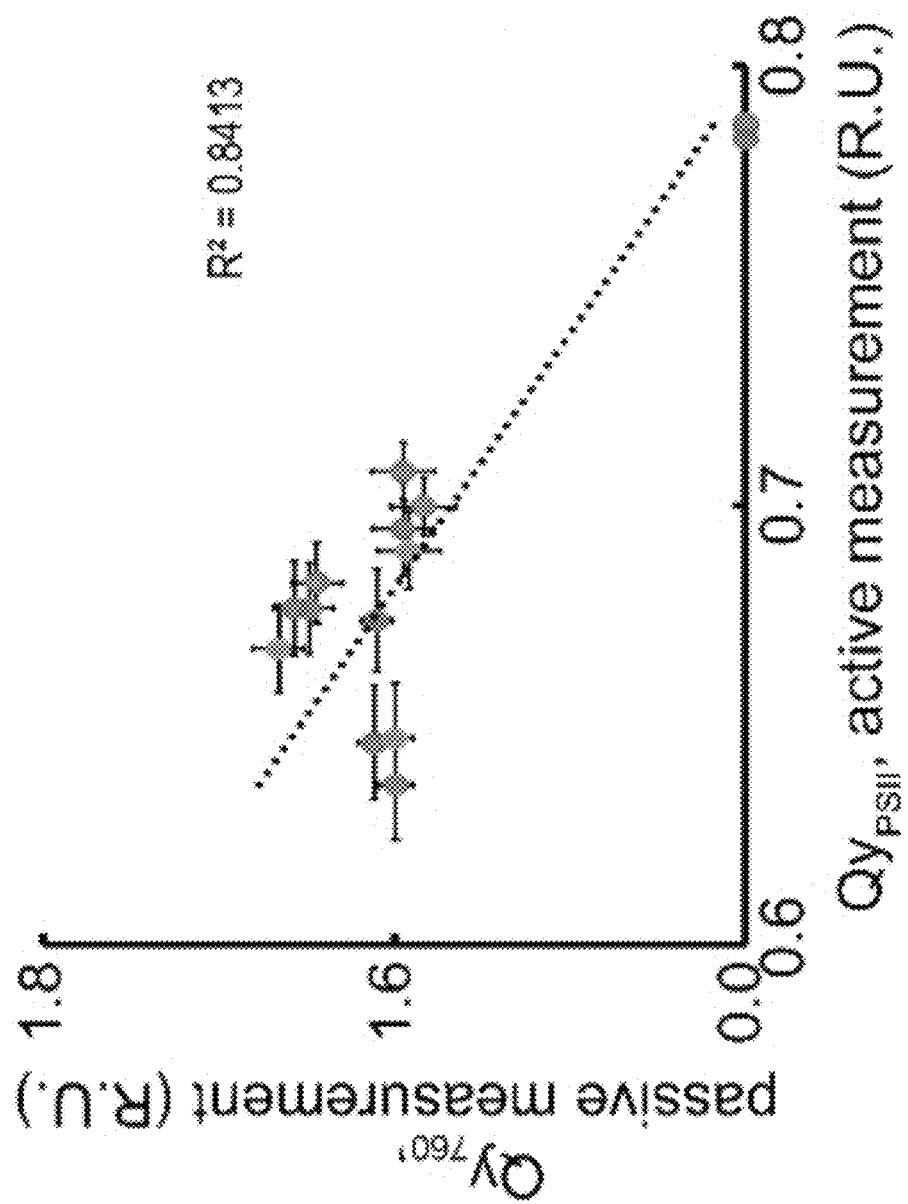
Figure 4D:
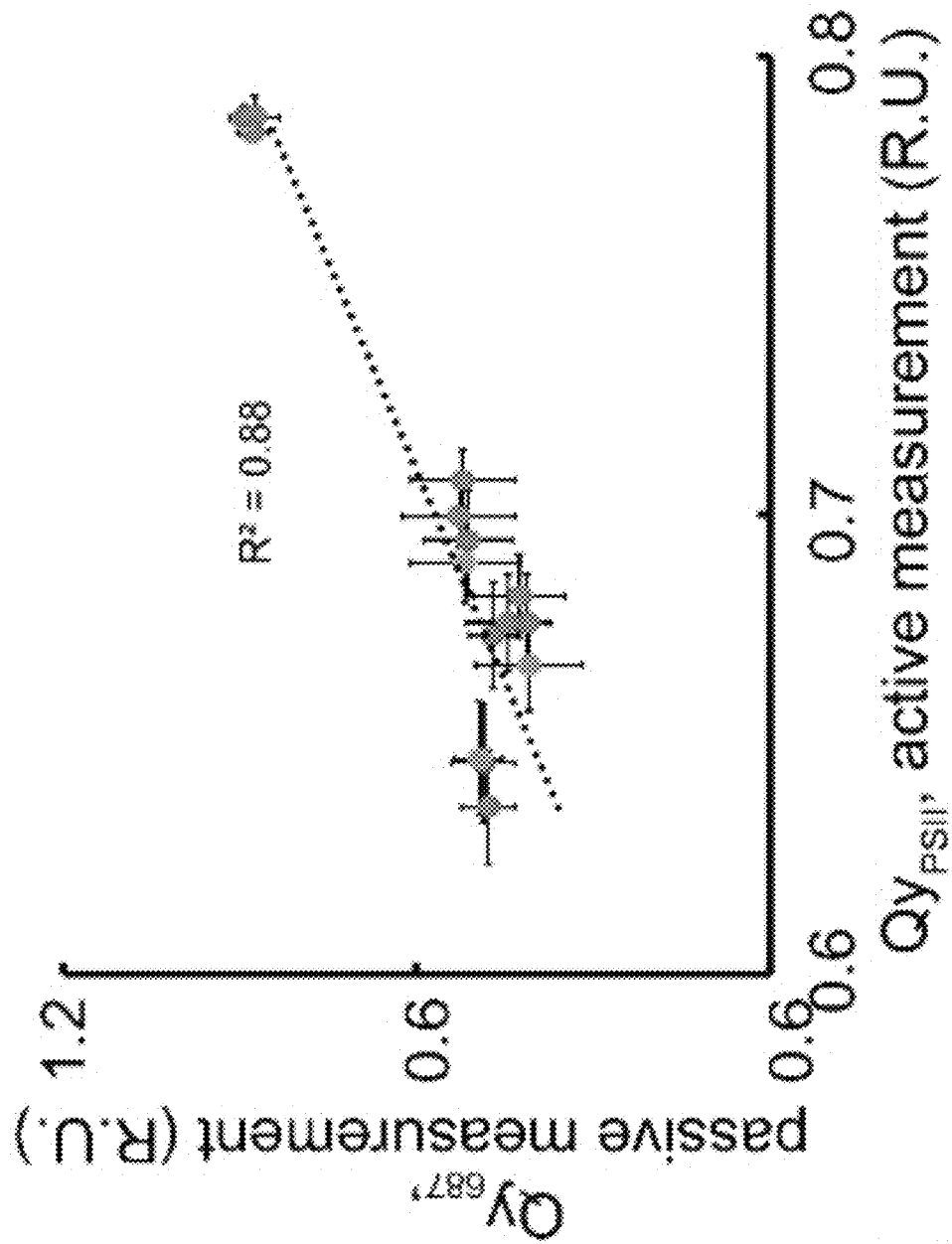

Quantum yield is calculated for the two Fraunhofer oxygen absorption lines of oxygen in the 687 nm and 760 nm wavelengths. FIGS. 4A-4D show measurements of *L. sativa* under four fertilization concentrations of 30, 60, 120, and 300 ppm. Each point represents 30 repeats of the measurement acquired either with a hyperspectral sensor situated at ~1.5 meters above the crop in order to record the light dispersed from the canopy, or with PAM measuring the quantum yield from the center of a fully opened young leaf (young defined as the 3-5 leaves from the top meristem which are visible to the hyper spectral sensor). Linear regression trend line is shown within each panel as a dashed line with the coefficient of determination value next to it. In FIG. 4A, groups are uncorrelated where Pearson's test obtained a level of $p > 0.05$ confidence interval. In FIG. 4B, the correlation was found to be positive and significant at $p < 0.05$ confidence interval. In FIG. 4C, groups are negatively correlated and significant at $p < 0.05$ confidence interval. In FIG. 4D, groups are positively correlated with significance at $p < 0.05$ confidence interval.

Figure 5A:
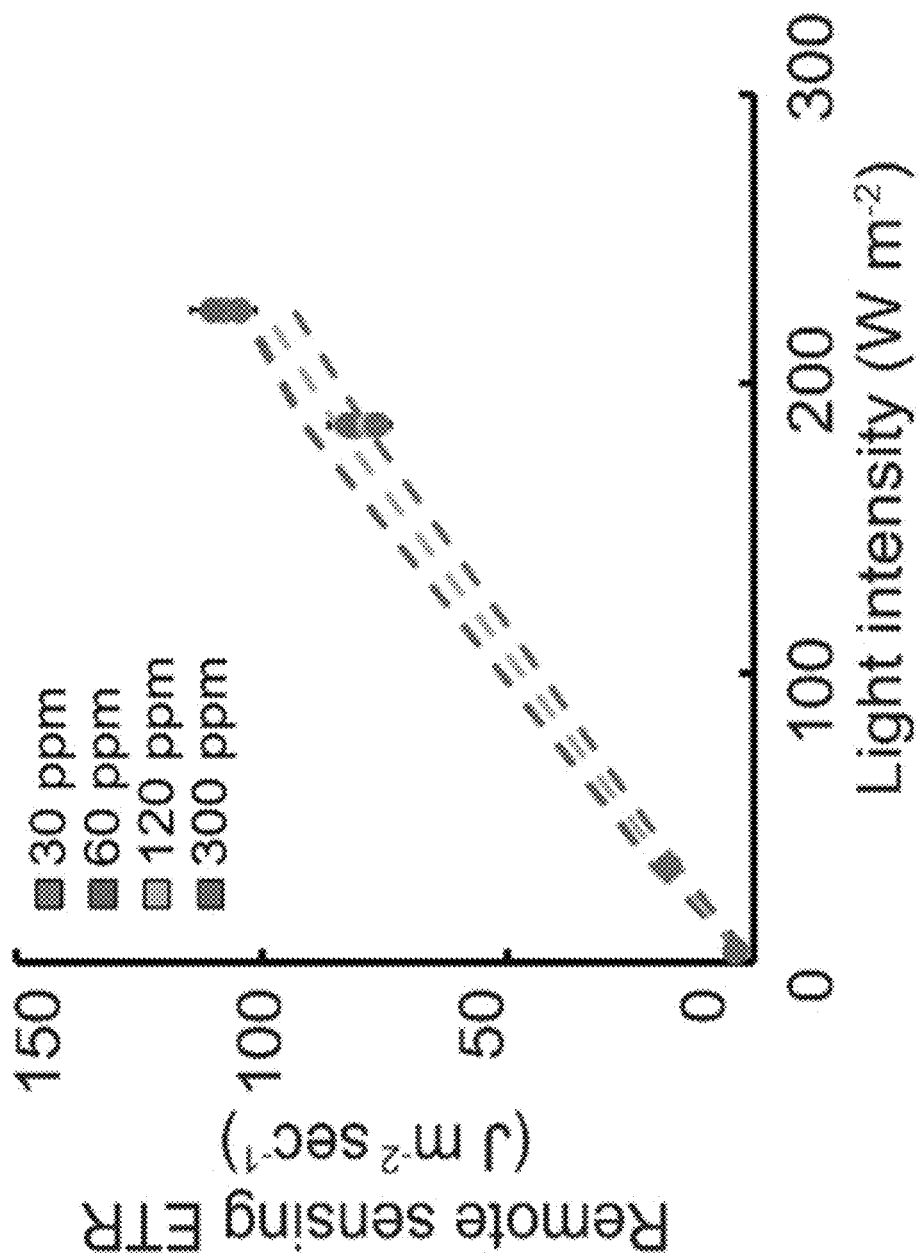
FIGS. 5A-5C show remote sensing electron transport rate (ETR) linearly correlated with the ground truth measurement and prediction of plant's health and capacity to perform photosynthesis, in accordance with some embodiments of the present disclosure.
Figure 5B:
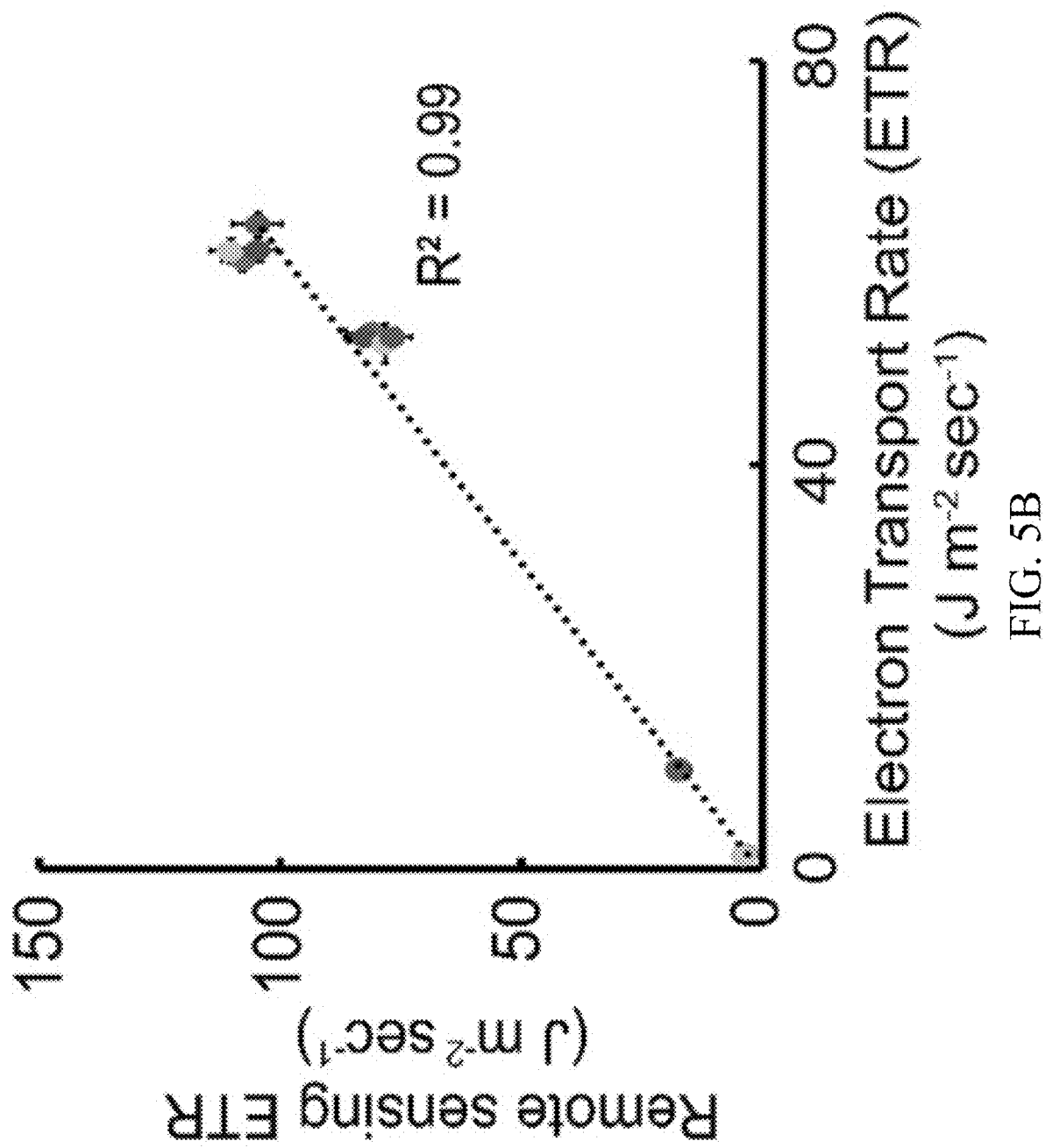
Figure 5C:
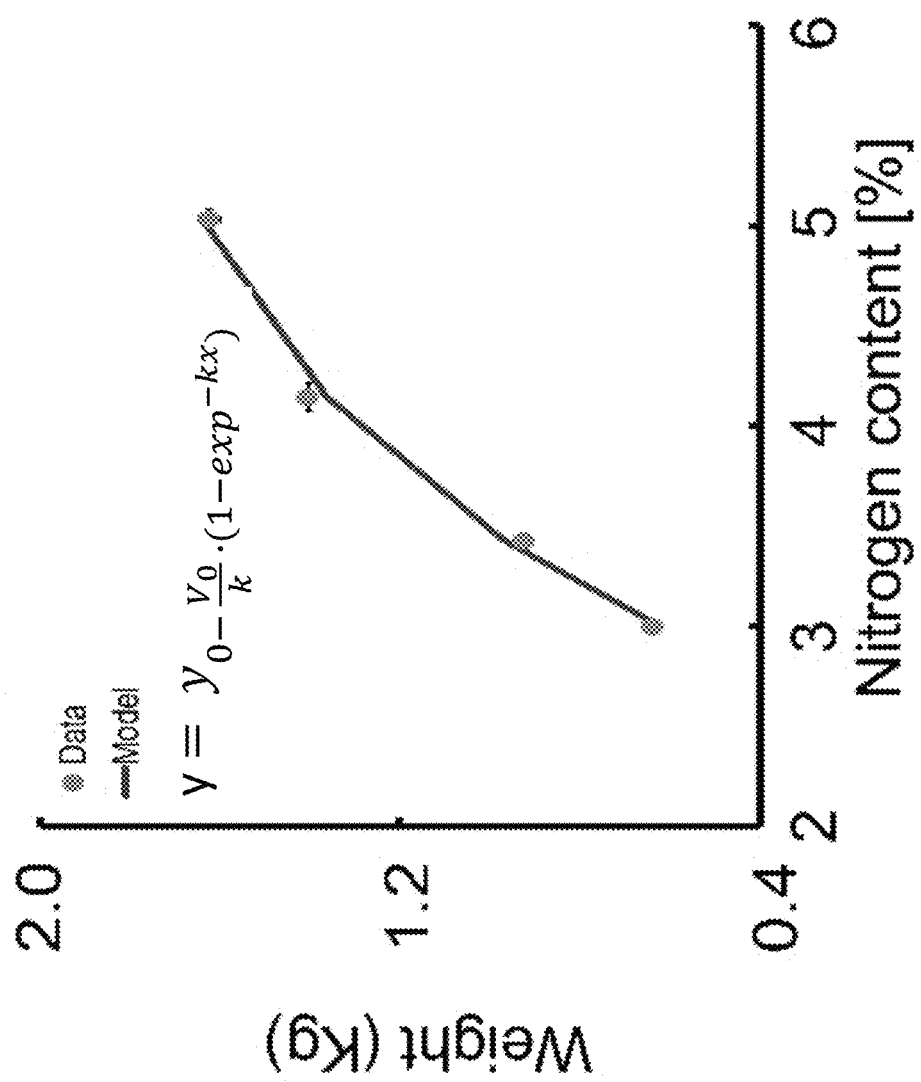

FIGS. 5A-5C show remote sensing electron transport rate (ETR) linearly correlated with the ground truth measurement and prediction of plant's health and capacity to perform photosynthesis.

FIG. 5A shows ETR calculated for each of the following fertilizer treatments: 30, 60, 120, 300 ppm (dots seen on the graph, n=30). The dashed line represents an average of the fit of the non-linear equation to the calculated points. Only those fit values with coefficients of determination at $r^2 > 0.9$ were taken for further analysis. Therefore, each dashed line represents an average of at least 15 samples per a single fertilization treatment. The correlation between the dots and the fitted curve is specified within the graph as per a fertilization treatment. Differences between light intensities per each fertilization treatment is significant at the $p < 0.05$ confidence level. FIG. 5B shows remote sensing ETR calculation correlated with the ground truth ETR calculation according to Genty 1989 (see, Genty B, Briantais J-M, Baker N R (1989) The relationship between the quantum yield of photosynthetic electron transport and quenching of chlorophyll fluorescence. *Biochimica et Biophysica Acta (BBA)—General Subjects* 990(1):87-92) and performed with the PAM. Error bars represent standard errors of the mean. Groups are positively correlated at the $p < 0.05$ confidence level. FIG. 5C shows final outcome of the biomass production of *L. sativa* measured two weeks after the measurement and at the end of the cultivation cycle, where the weight linearly correlates with the nitrogen level of the fertilizer, and an example of the biomass is seen in the upper subset. Error bars represent standard error of the mean, n=30. Difference between fertilization treatments are statistically significant at the $p < 0.05$ confidence level.

Figure 6A:
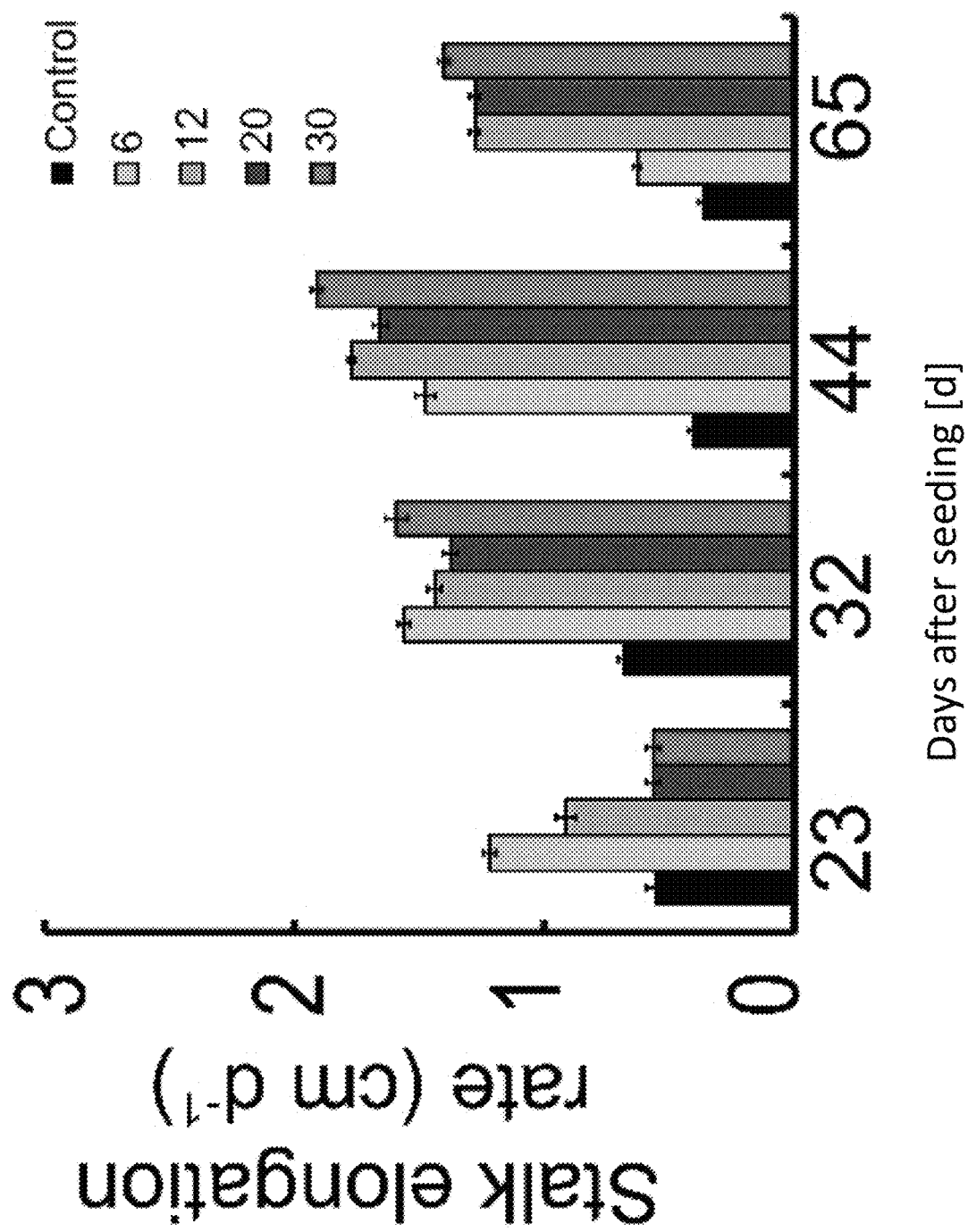
FIGS. 6A-6C show prediction from remote sensing ETR of plant health in the case of *Z. mays* "sweety" cultivar 2212.
Figure 6B:
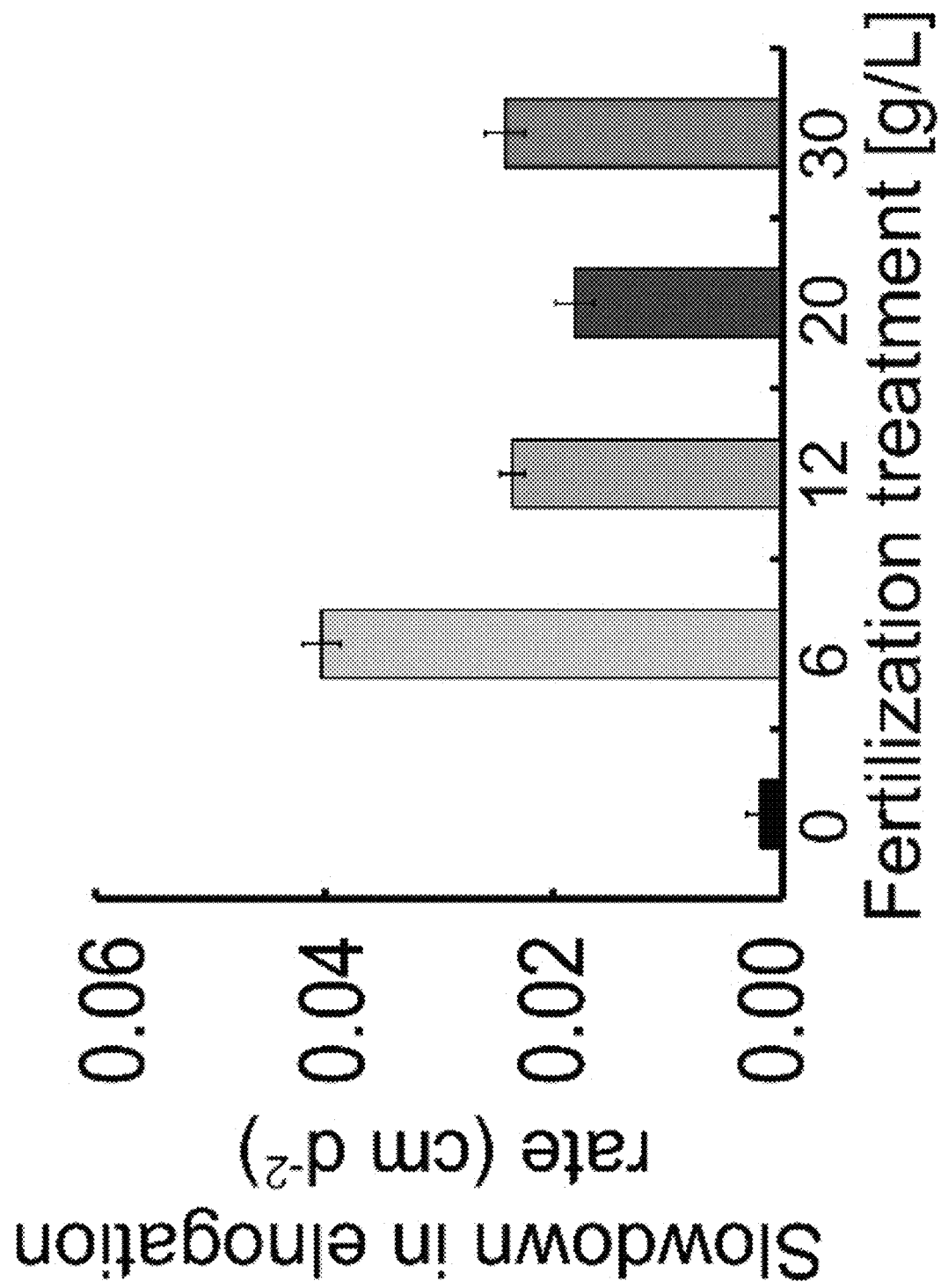
Figure 6C:
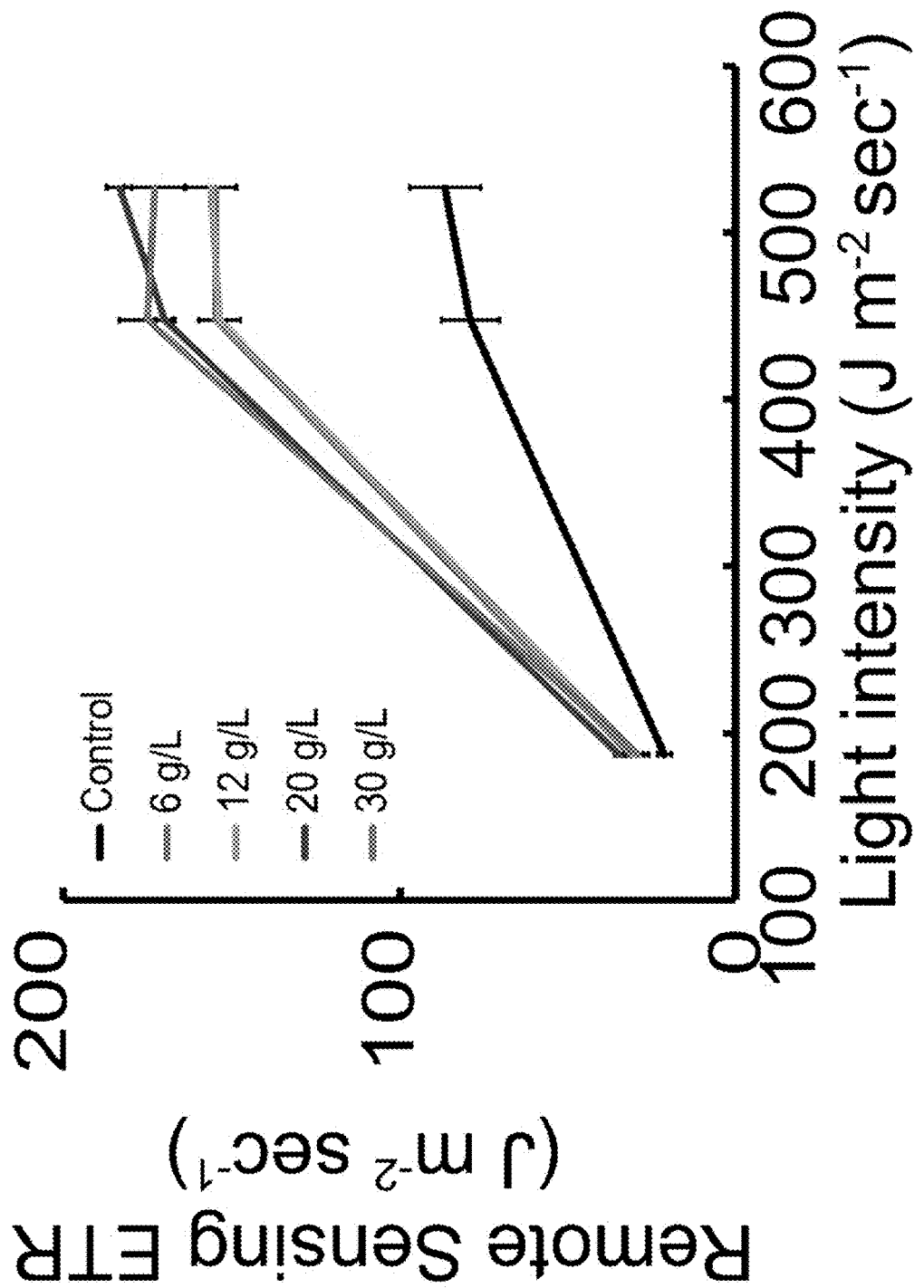

FIGS. 6A-6C show prediction from remote sensing ETR of plant health in the case of *Z. mays* "sweety" cultivar 2212.

In, FIG. 6A, stalk elongation of the corn was measured as a visual proxy for biomass production of *Z. mays* experiencing a fertilization gradient, with control (irrigation only), 6, 12, 20 and 30 g of total nitrogen per L of irrigation, as the fertilizer type was a slow release Multicote (ICL, Haifa, Israel) administered at the beginning of the cultivation season. Four measurement days were selected during the season at 23, 32, 44 and 65 days after seeding the corn in the pots. N=5 with 4 technical repeats per each biological repeat and error bars representing standard error of the mean. Differences between time points and within time points are statistically significant at the p<0.05 confidence level.

In FIG. 6B, the change in elongation rate between the $44^{th}$ and the $65^{th}$ was calculated in order to account for the primary production event compared with the remote sensing ETR calculation performed on the $65^{th}$ day. N=5, with 4 technical repeats per each biological repeat. Differences between groups are statistically significant at the p<0.05 confidence level.

In FIG. 6C, calculation of remote sensing ETR at three time instances during the $65^{th}$ day were performed at 07:30 AM, 10:30 AM and 12:00 PM where the light intensity was 189, 455 and 532 (W $m^{-2}$, respectively). The points are connected in straight connector lines in order to present the trend of the curve. N=5, with 4 technical repeats per each biological repeat, and error bars represent standard error of the mean. Fertilization treatment is identical to the above panels. Differences between fertilization treatment within and between time points are statistically significant at the p<0.05 confidence level.

Table 2 details all remote sensing vegetation indices vegetation that were calculated in the present experiment. Remote sensing vegetation indices report on plant function, biophysical characteristics and photosynthetic activity. Their calculation is extracted from the reflectance profile at distinct wavelengths, and of broad band regions within it. The Sun-Induced Fluorescence is calculated by considering not only the reflectance profile, but also the Radiance and Irradiance absolute light flux profiles dispersed from the crop and a reference panel, respectively.

| # | Vegetation Index name and acronym | Formulation | Reference |
|---|---|---|---|
| 1 | Normalized Differential Vegetation Index (NDVI) | $(\rho 800 - \rho 670)/(\rho 800 + \rho 670)$ | Haboudane D, 2004 |
| 2 | Photosynthesis Reflectance Index (PRI) | $(\rho 531 - \rho 570)/(\rho 531 + \rho 570)$ | Gamon J, 1992[1] |
| 3 | Improved Sun Induced Fluorescence | $\dfrac{\alpha_R \cdot I_{out} \cdot L_{in} - I_{in} \cdot L_{out}}{\alpha_R \cdot I_{out} - \alpha_F \cdot I_{in}}$ | Alonso L, 2008 |
| 4 | Effective Quantum Yield ($\varphi II$) | $\dfrac{Fm' - Ft}{Fm'}$ | Genty B, 1989 |
| 5 | Electron Transport Rate (PAR) | $\varphi II * 0.5 * PAR$ | Maxwell, 2000[2] |
| 6 | Remote Sensing Quantum Yield | $\dfrac{SIF_{687}}{SIF_{687} + SIF_{760}} \cdot NDVI$ | Present Disclosure |
| 7 | Remote Sensing Electron Transport Rate (ETR) | $\dfrac{SIF_{687}}{SIF_{687} + SIF_{760}} \cdot NDVI \cdot PAR$ | Present Disclosure |

[1]Gamon JA, Peñuelas J, Field CB (1992) A narrow-waveband spectral index that tracks diurnal changes in photosynthetic efficiency. *Remote Sensing of Environment* 41(1): 35-44
[2]Maxwell K, Johnson GN (2000) Chlorophyll fluorescence--a practical guide. *J Exp Bot* 51(345): 659-668

Experimental Conclusions

In some embodiments, the present disclosure provides for a novel remote sensing calculation of the quantum yield and the non-cyclic electron transport rate of crops out of photosystem II. The advent of modern drone technology introduces the ability to overpass a specific site several times a day. It thus enables the exploration of the required temporal resolution of diurnal changes in photosynthesis and, at the same time, the investigation of the system to perform primary production step while relying on the history of the crop grown until the point of measurement. However, the first necessary step on the way to establishing a temporally-dependent measurement is to construct innovative means that correlate with reference leaf-level photosynthetic measurement techniques.

In view of the reference remote sensing indices, the diurnal attenuation in this study corroborates past observations. It was previously found that recording spectra from the nadir (normal to the ground) while the sun is situated right above the sensor reduces the NDVI index values by a magnitude. They termed the phenomenon "hot spot" due to its singular visibility on a graph of NDVI values as a function of the time of the day. It was also found that the change in the NDVI magnitude with the time of the day, where wider angles from the nadir establish an increased reflectance profile magnitude and, changes the NDVI values.

In the present experiments, it was found that this so-called 'hot spot' effect was more pronounced with higher doses of fertilizer (FIG. 3A), where the differences within each light intensity group, (i.e., the differences between fertilization treatments) are statistically significant. The gradient between the fertilization treatments in the NDVI is expected, because this index also predicts nitrogen content in the crop, and consequently shows a linear trend with that of the nitrogen content (FIG. 2B) of the fertilization treatment. An alternative explanation for the decay in the NDVI value at noon is due to its ability to predict Leaf Area Index. It was previously shown that the LAI value decreases until noon, and this may be the reason for the overall decay in the NDVI signal. The Zeaxanthin index (PRI) shows a converted profile of what should be expected for the behavior of the index (FIG. 3B). While there is a slight rise in the overall magnitude between 07:30 and 09:30 AM, this behavior shifts and decays with time until noon (225.3 W $m^{-2}$ light intensity in the figure). There are no statistically significant differences between the fertilizer treatments, likely due to the special conditions in the experiment in order to avoid an excess of light energy damage to the crops. The PRI index changes its meaning at different temporal resolutions, where it predicts the quantum yield on an annual cycle and the capacity of the photoprotection step of the apparatus on a diurnal cycle while calculating the Zeaxanthin photoprotective carotenoid concentration. However, while a rise in the carotenoid concentration was expected with light intensity, the opposite phenomenon was also observed. This was previously explained by the fact that the PM index actually predicts the EPoxidation State or the overall carotenoid cycle attenuation, where the overall pool of carotenoid increases with light intensity. Thus, the magnitude of the index becomes smaller and the value declines with light intensity. The fluorescence coming out of the photosynthetic reaction centers peaks at a maximal intensity of 684 nm and 740 nm for PSII and 722 nm for PSI. Therefore, the $SIF_{760}$ signal presents both the PSII and PSI mixed signals with unequal portions of the fluorescence between PSII and PSI. However, the PSI fluorescence contribution is considered negligible at high light intensities that occur at noon (FIGS. 4C and 4D) and the $SIF_{687}$ signal contains mostly PSII with some interference of the fluorescence tail profile of PSI.

While the overall activity of the photosystems increases with light intensity, it is observable that the two signals behave differently. The $SIF_{760}$ reaches a plateau at noon while the $SIF_{687}$ increases almost linearly with intensity. This is expected behavior because as more photosystems are recruited to harvest light and perform photosynthesis, the excited centers of photosystem I-$^3$P700 and, specifically, P700$^+$-efficiently quench fluorescence. This explains the quench in the fluorescence (in other words, explaining its re-absorption by the apparatus at noon for the 760 nm signal). Altogether, there was a similarity between the fluorescence emitted from the various fertilizer treatments trend in both SIF signals, while the error bar magnitude was bigger for the $SIF_{760}$ than the $SIF_{687}$. This implies that there are several sub-processes which have an impact on the variability of the signal at the 760 nm wavelength, as expected with a photosystems mixed signal.

Quantum yield of the photosynthetic apparatus describes the ability of the photosystems to harvest light and report on the photosynthetic capacity of the organism. SIF yield has been used as the remote sensing equivalent of the leaf level effective quantum yield under ambient light and is defined as the ratio between the fluorescence emitted from, and the light absorbed by the plant at a given time. In order to assess the fraction of the absorbed light, researchers can measure the amount of light above the canopy, below the canopy, and perform a calculation on both of the terms in order to extract how much light was absorbed by the canopy. This measurement is labor-intensive when considering large vegetation areas where the transmittance of light through the canopy changes on a spatial scale and multiple measurements are required. An alternative to this technique is to replace the absorbed light fraction with NDVI, as this was proven to be linearly correlated between various types of plants and canopy geometries both for multispectral and hyperspectral sensors. However, the SIF yield term shows a clustering pattern for both SIF signals, with a very low correlation to the effective quantum yield term. Each of the subgroups in the panels reflects a different light intensity/hour during the day, whereas the 760 nm SIF yield exhibit a negative correlation and low test's P-value.

Accordingly, in some embodiments, the present disclosure provides for a quantum yield calculation which offers much higher correlation results for both Oxygen absorption lines. The calculation is conceived as the probability of two events to simultaneously occur, and so the two event probabilities are multiplied by each other. The two events are the absorption of light by the plant (which is dependent on the leaf area index), and the chlorophyll content. The NDVI index convolves these two traits as the first term, and then every active photosystem that emits fluorescence is reflected in the second term, where the fraction of PSII is brought about as the ratio between it and the overall fluorescence emission in both of the Fraunhofer atmospheric absorption lines. In the present disclosure, the isolation of the two photosystems is considered in the division of each of the SIF signals by the sum of the two fluorescence magnitudes. This way, the fraction of excitation to the overall successful excitations of the two photosystems is normalized. While both lines now exhibit a better correlation, there still exists an opposite trend between the reference quantum yield signal and the novel remote sensing calculation at the 760 nm oxygen absorption line. This is probably because the $SIF_{760}$ measured in the early morning was negative and omitted from the presentation. Omitting these points from the panel will not improve the correlation, because it is visible that there is no trend between the light intensities in the case of the 760 nm measurement. This is not the case, however, for the second Oxygen absorption line (FIG. 4D). Here, even upon omitting the singular points at $Qy_{PSII}$ at 0.8 (R.U.), the trend line remains positively correlated due to the alignment position of the group of points.

In some embodiments, the present disclosure further provides for using the remote sensing quantum yield term to predict the electron transport rate out of photosystem II. In general, the assessment of the fluorescence light response curve is similar to that of the light response curve of oxygen evolution or carbon assimilation. For example, it was shown that ETR behaves in a similar fashion, as the carbon assimilation curve in two crops of C3 and C4 photosynthesis types and under various light intensities. It was also proposed to shorten the time step between successive time points of gradually increasing artificial illumination reports on the feasibility of the photosystems to perform electron transport rate when considering underwater plants. The light response curve acquires two parts:

A light-dependent part, in which activity increases with light, and a light-independent part, where the activity remains the same regardless of the added light.

In principle, there is also a third part in which the curve decline implies the arrest of photosynthetic activity at very high light intensities. Fitting a non-linear curve enables the extraction of a set of additional parameters that report on various characteristics of the apparatus and which are not immediately available from a single measurement of the crop photosynthetic activity, as can be seen in table 3 below. These are the maximal light intensities that, when obtained, the system reaches the maximal activity and the beta/omega factor which implies the amount of stress exists on the apparatus.

A non-linear hyperbolic function may be this fitted to the calculated remote sensing electron transport rate points on the light response graph. Fits exhibit prediction rate of the original behavior at $r^2>0.9$ and were taken for further analysis to extract the model parameters. N was at least 12 for each parameter. Errors represent standard error of the mean. Differences between groups are statistically significant only for the Slope, Ik, and Omega parameters at the $p<0.05$ confidence level.

TABLE 3

Parameter values extracted from the non-linear fit to the remote sensing light response curve in L. sativa.

| Fertilization treatment [ppm N] | Slope (R.U.) | Im (J m$^{-2}$ sec$^{-1}$) | Ik (J m$^{-2}$ sec$^{-1}$) | Pm (J m$^{-2}$ sec$^{-1}$) | Omega ((R.U.) |
|---|---|---|---|---|---|
| 30 | 0.640 ± 0.07 | 3021.145 ± 611.8 | 576.245 ± 136.1 | 1174.244 ± 300.9 | 1.447 ± 0.9 |
| 60 | 0.623 ± 0.05 | 2060.876 ± 512.8 | 361.934 ± 99.9 | 694.043 ± 223.6 | 1.953 ± 1.1 |
| 120 | 0.614 ± 0.05 | 3329.543 ± 390.6 | 556.952 ± 99.4 | 1149.438 ± 248.8 | 4.014 ± 1.6 |
| 300 | 0.465 ± 0.02 | 3253.250 ± 537.657 | 627.346± 107.4 | 1486.404 ± 267.1 | 0.457 ± 0.42 |

Calculating the activity of the plant by multiplying the present novel remote sensing quantum yield term with the amount of light acquired during the measurement, resulted in straight lines with an angle of almost 45° from x-axis for all the fertilization treatments (FIG. 5A).

The extracted parameters show that the Im is far above (almost ten times) the maximal light intensity during the experiment (Table 1). This means that no light intensity during the cultivation of the Lettuce could hamper the maximally-attainable production and that in view of the environmental conditions, where some of the samples received an over-fertilization treatment, there was no effect on the apparatus. This resulted in a linear trend between the final biomass achieved and the implemented doses of fertilizer (FIG. 5C). Comparing the results of our calculation with that of the reference hand-held fluorometer resulted in an $r^2=0.99$, implying that the measurement does predict the electron transport rate out of photosystem II.

Accordingly, the present inventors have been able to verify the ability of the present innovative index to predict plant health under excessive temperatures, and varying light and fertilizer concentrations as occurred during the acquisition of a similar dataset prior to the lettuce experiment with Z. mays.

Z. mays does not present photoinhibition characteristics and, in addition, is known to show a similar trend between the light-dependent $CO_2$ assimilation and fluorescence light response curves. In that previous dataset, only three time points were taken (FIG. 6C), therefore it was possible to calculate the quantum yield index and to construct the light response curve but did not succeed in fitting a curve owing to the limited number of measurements. Nevertheless, even without the fit, the curve is able to predict plant health and decline in the growth rate as measured by the change in the growth rate of the stalk of the corn (from the ground in the pot to the top meristem) (FIG. 6B). There is a similarity in the behavior of the curve at the plateau to the magnitude of the change in the growth. While the control showed only marginal activity but did not bend, its change in growth was abrupt. This is because differences between the two successive measurement points were small and therefore the change is also small. In the light response curve, the green curve is the only one that continues to elevate and does not bend as it does for the other curves. It is also evident in the change of growth where it was the lowest after the control. Finally, the curve of the over-fertilization treatment did bend down, which implies that the photosystem II of the corn was less active in electron transport; this is evident by the statistically significant magnitude increase between the green and red curves.

Additional Calculations

Figure 7B:
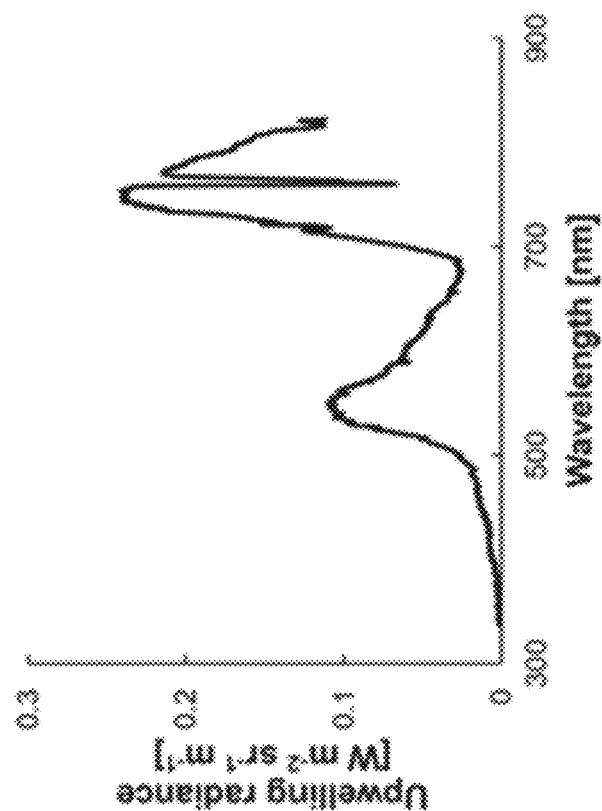
FIGS. 7A and 7B illustrate simultaneously recorded profiles of reflected light.
Figure 7A:
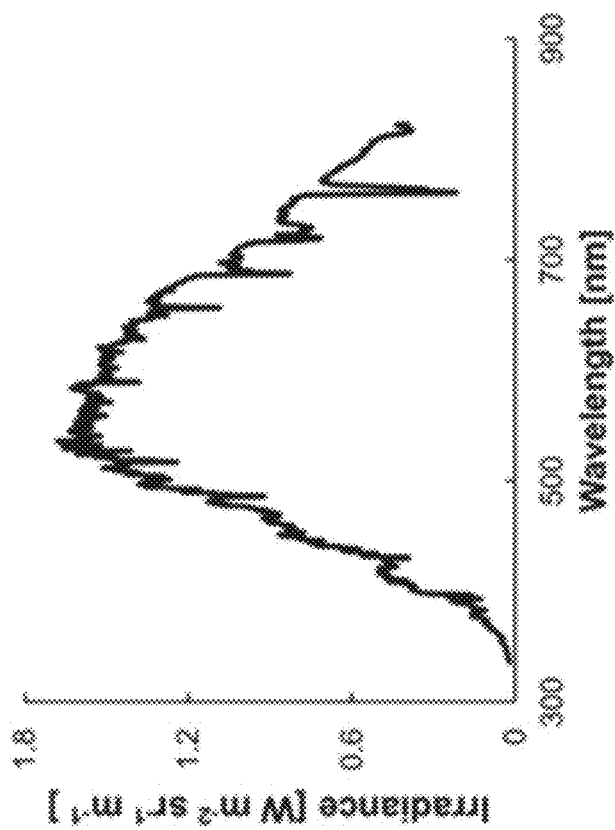

FIGS. 7A and 7B illustrate simultaneously recorded profiles of reflected light. FIG. 7A shows ground-measured reflectance from a reference plate (a measure of sun irradiance). FIG. 7B shows upwelling reflectance from a crop canopy, in accordance with some embodiments of the present invention. Spectrum intensity units are converted from photon counts to light flux, that is, counts of photons per pixel per integration time were converted to light flux units of: $Wm^{-2}sr^{-1}m^{-1}$. The following equation indicates the conversion parameters:

$I$=(Photon count−Dark Current count)·$f$(Nominal count,band pass,solid angle)/Area where, Nominal count (Joule/count) is the energy of a single photon hitting the sensor at any wavelength, received from a calibration equipment or calculated from the equipment specifications;

Area ($m^2$) is the base of a cone from which photons are dispersed on the sensor;

Solid Angle is the solid angle of the cone collecting all the photon dispersed from a plant; 0.0055 spherical steradians or 12.4 degrees for the spectroradiometers;

Bandpass ($nm^{-1}$) is the width between two successive wavelengths in the recorded spectrum. The value varies from 0.4 to 0.45 and is calculated as:

bandpass[wavelength]=−½(wavelength$_{i+1}$−wavelength$_{i-1}$)·1E−09

Subtracting the dark current from the pixel count (pixel per pixel, where each pixel represents a single band/wavelength), reduces noise. The above calculations are performed both for the irradiance (reference) flux and for the "upwelling" radiance (vegetation) curves (FIGS. 3A and 3B).

Figure 8:
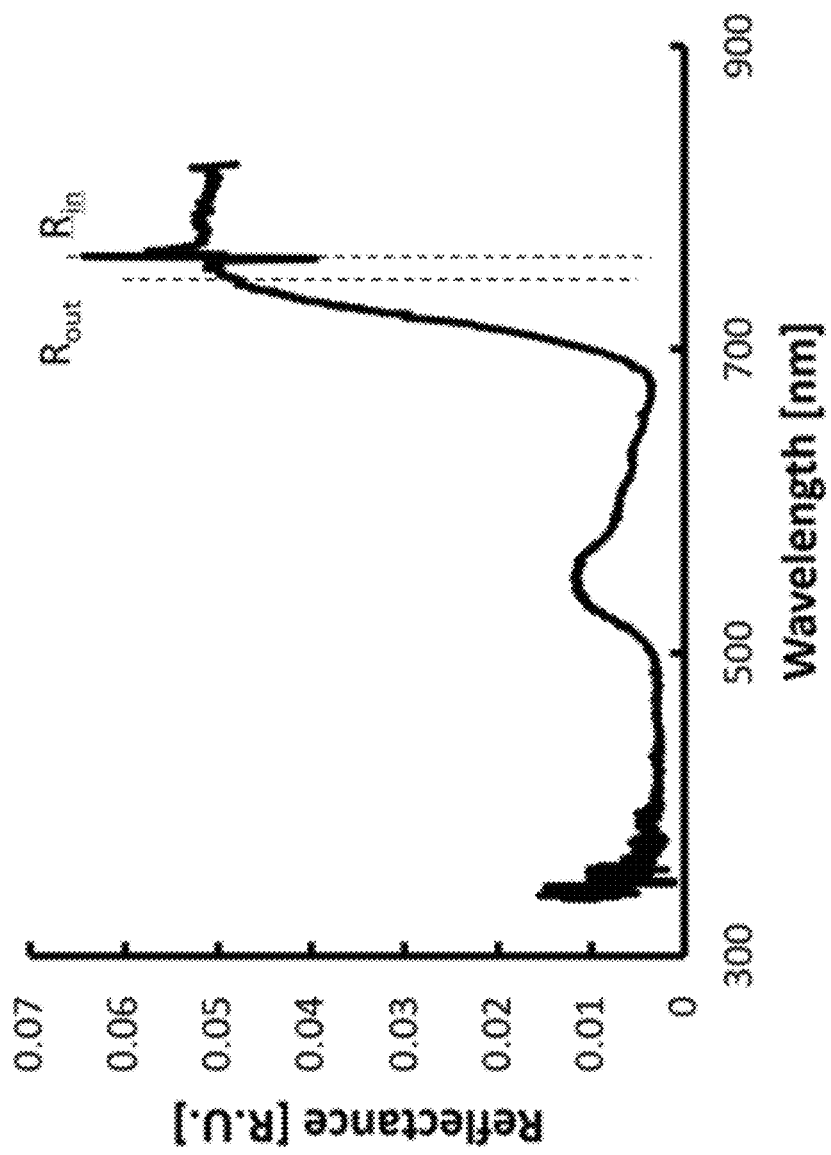
FIG. 8 illustrates a normalized reflectance profile, which is an upwelling profile normalized for irradiance, in accordance with some embodiments of the present invention.

FIG. 8 illustrates a normalized reflectance profile, which is an upwelling profile normalized for irradiance, in accordance with some embodiments of the present invention. The normalized reflectance profile, also called a "bi-directional distribution function" (BRDF) (Nicodemus, 1977), is calculated by normalizing the upwelling radiance according to the irradiance at a given moment, and also by correcting for the sun's position in the sky, its distance from earth, and a specific interaction profile of light with respect to the geometry of the plant canopies. The BRDF calculation is typically made with the assumption that the light reflected from the plant is reflected in a complete diffusive (lambertian) manner (Van de Hulst H C, 1980). The formulation of the normalized reflectance profile calculation is:

$$R = \pi \cdot \frac{\left(\frac{D}{D_0}\right)^2 \cdot \text{Radiance}}{\cos(\theta) \cdot \cos(\varphi) \cdot T(\theta) \cdot \text{Irradiance}}$$

where,

R is the BRDF, or normalized reflectance profile, corrected according to the geometry of the plant canopy, θ a function of the position of the sun with respect to the nadir point, and as a function of φ, the azimuth angle of the sun with respect to the sensor position.

π/cos(φ)=normalization of the sample, where π assumes a hemispheric diffuse light (specular component of reflectance is zero). Hereinbelow, an approximation is made that cos(φ) is equal to 1.

Cos(θ)=Correction for the position of the sun as θ with respect to the nadir point.

$\left(\dfrac{D}{D_0}\right)$ = Distance of the sun from the earth in astronomical units divided by the average distance.

D is calculated by assuming the earth moves in a Keplerian orbit around the sun (Hammen D 2015):

$$D = a \cdot (1-e^2) \cdot \left\{1 - e \cdot \cos\left[\frac{\theta}{\text{days in year}} \cdot (\text{day}-4)\right]\right\}$$

The original Kepler formulation is a division of the second by the third argument, however for small numbers $$\frac{1}{1+x} \approx 1-x.$$

a=the length of the semi-major axis of earth's orbit.

e=Eccentricity of the orbit.

Θ=the angle of one complete turn around the sun, assuming 360° for a perfect circle.

days in year=365.25 days.

day −4=the day of the measurement starting from the 4$^{th}$ of January when earth crosses the perihelion mark of the orbit.

If R is calculated in astronomical units (AU), then the two first arguments equal ~1 AU and the formulation shortens to:

$$R = 1 - 0.01672 \cdot \cos[0.9856 \cdot (\text{day} - 4)]$$

$D_o = 0.995$ is the average distance of the earth from the sun.

$T(\theta)$=Calculated per wavelength with MODTRAN®, which mimics the atmosphere condition during the measurement and therefore calculates the transmission cofactor per wavelength.

Cos ($\theta$)=is the zenith angle of the sun from the nadir point.

The normalized reflectance profile includes several regions of interest from which physical and physiological information regarding the plant can be extracted: 500-570 nm indicates stress related vegetation indices and chlorophyll concentration; 700-750 nm indicates plant age and chloroplast organization within the leaf; the 760 nm spike indicates passive chlorophyll a fluorescence emitted by the photosynthetic apparatus; 800-850 nm indicates optical properties of the plant as they are affected by the epidermis, mesophyll and other leaf molecular structures. Values of R at 650 nm and at 800 nm have been used to generate a term known as a "normalized difference vegetation index" (NDVI), which is calculated as:

$$NDVI = \frac{R_{800} - R_{670}}{R_{800} + R_{670}}$$

Figure 9A:
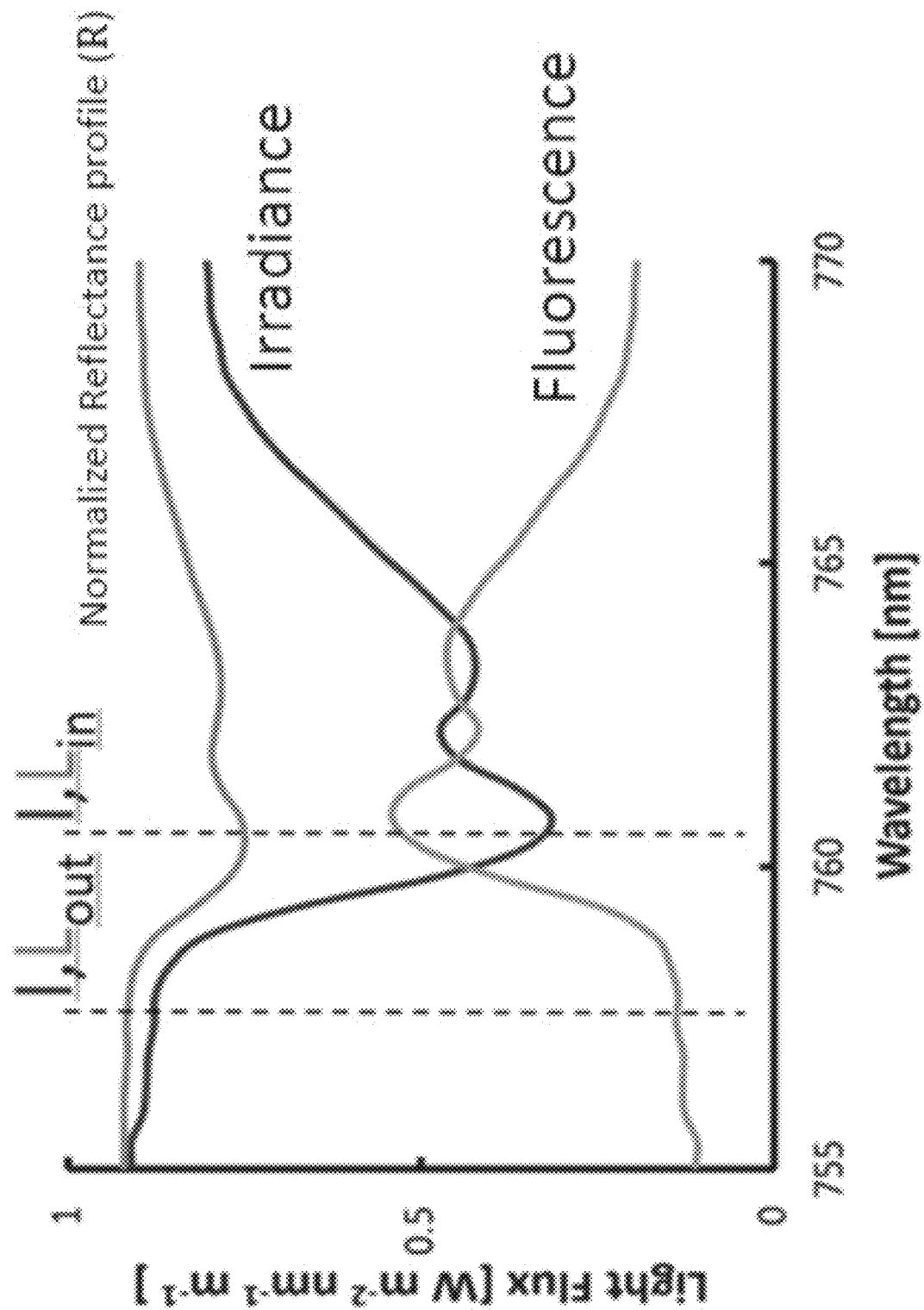
FIGS. 9A and 9B illustrate a calculated reflectance profile in the range of the atmospheric absorption well between 760 and 770 nm, in accordance with some embodiments of the present invention.
Figure 9B:
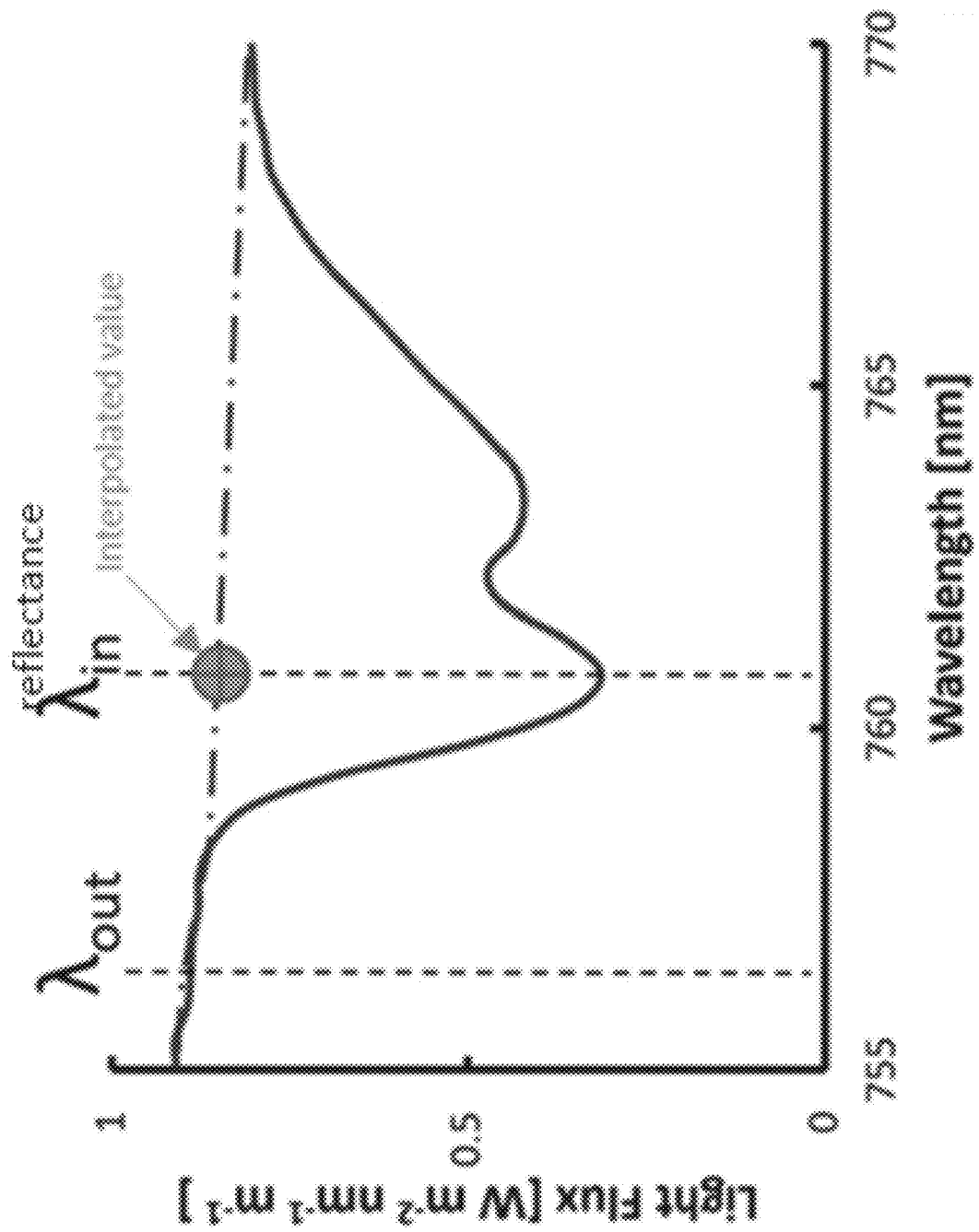

FIGS. 9A and 9B illustrate a calculated reflectance profile in the range of the atmospheric absorption well between 760 and 770 nm, in accordance with some embodiments of the present invention. A modified Fraunhoffer line discrimination technique (Plascyk 1975, Alonso 2008) may be used to calculate sun-induced fluorescence (SIF) signals emitted by the photosynthetic apparatus of the plant (FIG. 9A). Sunlight which penetrates through the atmosphere is absorbed at specific wavelengths by atom gases. The oxygen $O_2$-A absorbance band on the electromagnetic spectrum, around 760 nm, is used to calculate the SIF signals. A spline function is calculated over the absorption line in order to assess the values of reflectance wavelengths of the spectrum as if no absorption of oxygen occurred, and then correct the fluorescence calculation based on these values (FIG. 9B).

The oxygen $O_2$-A absorbance band for irradiance (reflection from the reference plate) is different in magnitude from the oxygen $O_2$-A absorbance band in the vegetation profile. This is due to the fluorescence signal emitted from plants in this region of the spectrum, which in FIG. 9A is presented as a simple subtraction of the two graphs (normalized reflectance profile). In FIG. 9B, $\lambda_{Out}$ and $\zeta_{in}$ are the wavelengths outside and inside the absorption well between 760 and 770 nm. Interpolated values are located on an interpolation function (dash-dotted line) between the edges of the absorption well.

The mathematical procedure for calculating SIF includes four calculations:

(i) Interpolation of the oxygen absorbance wells in the reflectance profile and irradiance profile graphs. (FIG. 5B shows an example for the irradiance profile).

(ii) Reflectance correction factor $\alpha_R = R_{out}/R_{in}^{interpolated}$ correction factor (iii) Apparent Fluorescence correction factor $\alpha_F = (\alpha_R \cdot I_{in})/(I_{in}^{interpolated})$ (iv) SIF calculation:

$$SIF = (\alpha_R \cdot I_{out} \cdot L_{in} - I_{in} \cdot L_{out})/(\alpha_R \cdot I_{out} - \alpha_F \cdot I_{in})$$

where, $R_{out}$ and $R_{in}$ are the values of the reflectance as seen in FIGS. 3A and 3B;

$I_{out}$—Irradiance;

$L_{out}$—Radiance;

$I_{in}^{intetpolated}$—Interpolated Irradiance;

$R_{in}^{intetpolated}$—Interpolated Reflectance (Alonso L, 2008)

FIGS. 3C and 3D illustrate the calculation of SIF, at the wavelengths of 760 and 687, for each of the four plant sectors receiving different fertilization treatments, in accordance with some embodiments of the present invention. FIG. 3C shows the $SIF_{687}$ value, which is calculated in a similar manner as the $SIF_{760}$ value, described above, at the oxygen B absorption well of 687 nm. Error bars represent standard error of the mean, as the measurements were repeated four times, as described above. Measurements were taken at four different times of a day from sunrise until noon. Each column represents an average of 30 samples and the error bars indicate the standard error of the mean.

FIGS. 3A-B illustrate graphs of indices calculated based on sun-induced fluorescence measurements of lettuce crops receiving four different fertilization treatments, in accordance with some embodiments of the present invention. In embodiments of the present invention, an index, referred to herein as the "normalized SIF response index" (NSRI), is calculated and shown to provide a prediction of quantum yield:

$$NSRI = \frac{SIF_{687}}{SIF_{760} + SIF_{687}} \cdot NDVI$$

where NDVI (normalized differential vegetation index) is calculated as described above.

FIG. 4D illustrates a comparison of "normalized SIF response indices" (NSRIs) of lettuce crops to fluorescence quantum yields measured for the same crops by a fluorometer, in accordance with some embodiments of the present invention. The level of correlation (coefficient of determination $R^2 = 0.88$) indicates that the NSRI index may be used as a remote measurement substitute for the quantum yield (Qy) measured by a fluorometer. Consequently, a normalized light response curve, which may be calculated from the quantum yield and which indicates the electron transport rate (ETR) between plant photosystem II (PSII), and photosystem I (PSI), may be estimated from the NSRI index by similarly multiplying the NSRI function by the light intensity function, giving

NSRI·$I$

This is also an ETR estimate, and can be written as $$\text{Light response}[Wm^{-2}] = k \left[ \frac{SIF_B(I)}{SIF_A(I) + SIF_B(I)} \cdot NDVI(I) \right] \cdot I$$

wherein I is the sunlight intensity for a given pair measurement, $SIF_A(1)$ and $SIF_B(1)$ are the solar-induced fluorescence values at the oxygen A absorption band of approximately 760 nm and and the oxygen B absorption band of approximately 687 nm, respectively. For a given pair measurement, NDVI is a normalized differential vegetation index at the sunlight intensity of the given pair measurement, and k is a constant configured for a given crop type;

This function of light intensity, as indicated above, can thus be substituted for the PAM-constructed light response curve, which has been shown to be an indicator of activity of the photosynthetic apparatus. The PAM light response curve is typically calculated from a measurement of oxygen evolution/carbon fixation rates, but it can also be approximated by the fluorescence emission of photosystem II (Henley W J 1993).

PAM-constructed light response curve can be calculated as follows:

$$\text{PAM } Q_y \cdot \text{PAR} \cdot 0.84 \cdot 0.5$$

Where,

PAM $Q_y$ is a value provided by the PAM measurement technique;

PAR is the Photosynthetically Active Irradiance, in flux units [W m$^{-2}$], the integration of the light energy between the 400 and 700 nm. PAR values may be received from a local meteorological station;

0.84 is the amount of light a general leaf absorbs; and 0.5 is a general assumption that assumes a ratio of 1:1 for PSII:PSI, where the active technique is exciting preferentially PSII.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of modified purpose computer, special purpose computer, a general computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   at least one hardware processor; and
   a non-transitory computer-readable storage medium having stored thereon program instructions, the program instructions executable by the at least one hardware processor to:
   receive, as input, spectral image data representing spectral reflectance associated with at least one plant,
   calculate a first chlorophyll fluorescence index in a first wavelength band, and a second chlorophyll fluorescence index, in a second wavelength bands, based, at least in part, on said spectral reflectance, and
   derive a quantum yield value with respect to said at least one plant, by:
   (i) dividing said first chlorophyll fluorescence index in a sum of said first chlorophyll fluorescence index and said second chlorophyll fluorescence index, and
   (ii) multiplying (i) by a vegetation index value associated with said at least one plant.

2. The system of claim 1, wherein said spectral image data comprises spectral image data received from a first spectral sensor configured to measure reflected light from a canopy of said at least one plant.

3. The system of claim 2, wherein said first spectral sensor is configured to perform said measuring remotely.

4. The system of claim 1, wherein said spectral image data further comprises spectral image data received from a second spectral sensor configured to measure ambient spectral irradiance received by said at least one plant.

5. The system of claim 4, wherein said spectral image data representing an ambient spectral irradiance received by said at least one plant is acquired concurrently with said spectral image data.

6. The system of claim 5, wherein said first and second chlorophyll fluorescence indices are calculated based, at least in part, on (i) said spectral reflectance, and (ii) said ambient spectral irradiance received by said at least one plant.

7. The system of claim 1, wherein said first and second chlorophyll fluorescence indices are each sun-induced fluorescence (SIF) indices.

8. The system of claim 1, wherein said first wavelength band is a Fraunhofer $O_2$-A spectral absorption line, and said second wavelength band is a Fraunhofer $O_2$-B oxygen spectral absorption line.

9. The system of claim 1, wherein said vegetation index is a normalized difference vegetation index (NDVI).

10. The system of claim 1, wherein said program instructions are further executable to calculate an electron transport rate value with respect to said at least one plant, by multiplying said calculated quantum yield value by a sunlight intensity parameter measured concurrently with said spectral image data.

11. A method comprising:
    receiving, as input, spectral image data representing spectral reflectance associated with at least one plant;
    calculating a first chlorophyll fluorescence index in a first wavelength band, and second chlorophyll fluorescence index in a second wavelength band, based, at least in part, on said spectral reflectance; and
    deriving a quantum yield value with respect to said at least one plant, by:
    (i) dividing said first chlorophyll fluorescence index in a sum of said first chlorophyll fluorescence index and said second chlorophyll fluorescence index, and
    (ii) multiplying (i) by a vegetation index value associated with said at least one plant.

12. The method of claim 11, wherein said spectral image data comprises spectral image data received from a first spectral sensor configured to measure reflected light from a canopy of said at least one plant.

13. The method of claim 12, wherein said first spectral sensor is configured to perform said measuring remotely.

14. The method of claim 11, wherein said spectral image data further comprises spectral image data received from a second spectral sensor configured to measure ambient spectral irradiance received by said at least one plant.

15. The method of claim 14, wherein said spectral image data representing an ambient spectral irradiance received by said at least one plant is acquired concurrently with said spectral image data.

16. The method of claim 15, wherein said first and second chlorophyll fluorescence indices are calculated based, at least in part, on (i) said spectral reflectance, and (ii) said ambient spectral irradiance received by said at least one plant.

17. The method of claim 11, wherein said first and second chlorophyll fluorescence indices are each sun-induced fluorescence (SIF) indices.

18. The method of claim 11, wherein said first wavelength band is a Fraunhofer $O_2$-A spectral absorption line, and said second wavelength band is a Fraunhofer $O_2$-B oxygen spectral absorption line.

19. The method of claim 11, wherein said vegetation index is a normalized difference vegetation index (NDVI).

20. The method of claim 11, further comprising calculating an electron transport rate value with respect to said at least one plant, by multiplying said calculated quantum yield value, by a sunlight intensity parameter measured concurrently with said spectral image data.

\* \* \* \* \*